(12) United States Patent
Patel et al.

(10) Patent No.: US 12,292,277 B2
(45) Date of Patent: May 6, 2025

(54) DETERMINING A VOLUME OF A TANK

(71) Applicant: Saudi Arabian Oil Company, Dhahran (SA)

(72) Inventors: Sahejad Patel, Thuwal (SA); Abdulwahab A. Halawani, Jeddah (SA); Hesham Jifri, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 267 days.

(21) Appl. No.: 17/840,929

(22) Filed: Jun. 15, 2022

(65) Prior Publication Data
US 2023/0408239 A1 Dec. 21, 2023

(51) Int. Cl.
*G01B 5/00* (2006.01)
*G01B 5/02* (2006.01)
*G01S 17/00* (2020.01)

(52) U.S. Cl.
CPC .......... *G01B 5/0002* (2013.01); *G01B 5/025* (2013.01); *G01S 17/00* (2013.01)

(58) Field of Classification Search
CPC .................. G01B 5/0002; G01B 5/025; G01B 2003/1074; G01B 3/1071; G01B 5/0004; G01B 5/02; G01B 5/08; G01B 3/10; G01B 2003/1079; G01B 5/0021; G01S 17/00
USPC ..... 73/149, 861, 865.8, 865.9, 866.5, 432.1; 33/1 V, 755, 758, 759, 770; 248/542
See application file for complete search history.

(56) References Cited

U.S. PATENT DOCUMENTS

| | | | |
|---|---|---|---|
| 6,546,644 B2 * | 4/2003 | Poineau | G01B 3/1071 |
| | | | 33/758 |
| 7,036,241 B2 | 5/2006 | Williams et al. | |
| 7,040,035 B1 | 5/2006 | Scarborough | |
| 9,188,472 B2 | 11/2015 | Hassell, Jr. | |
| 10,393,490 B2 | 8/2019 | Park et al. | |
| 10,640,360 B2 | 5/2020 | Johnson et al. | |
| 10,697,820 B2 | 6/2020 | Patel et al. | |
| 10,900,776 B2 | 1/2021 | Parrott et al. | |
| 2004/0221471 A1 * | 11/2004 | Graham | G01B 3/1071 |
| | | | 33/770 |
| 2016/0343124 A1 | 11/2016 | Sundheimer et al. | |

FOREIGN PATENT DOCUMENTS

RU 179798 U1 * 5/2018

* cited by examiner

*Primary Examiner* — Robert R Raevis
(74) *Attorney, Agent, or Firm* — Fish & Richardson P.C.

(57) ABSTRACT

A method and an assembly for determining a volume of a tank. A measuring tape having multiple magnets is attached to a first location of the tank. A first circumference of the tank at the first location of the tank is measured. A value of the first circumference is recorded. Multiple wheels coupled to the measuring tape are rotated. Responsive to rotating the wheels, the measuring tape is moved from the first location to a second location of the tank. A second circumference of the tank at the second location is measured. A value of the second circumference is recorded. Based on the value of the first circumference and the value of the second circumference, the volume of the tank is calculated.

33 Claims, 14 Drawing Sheets

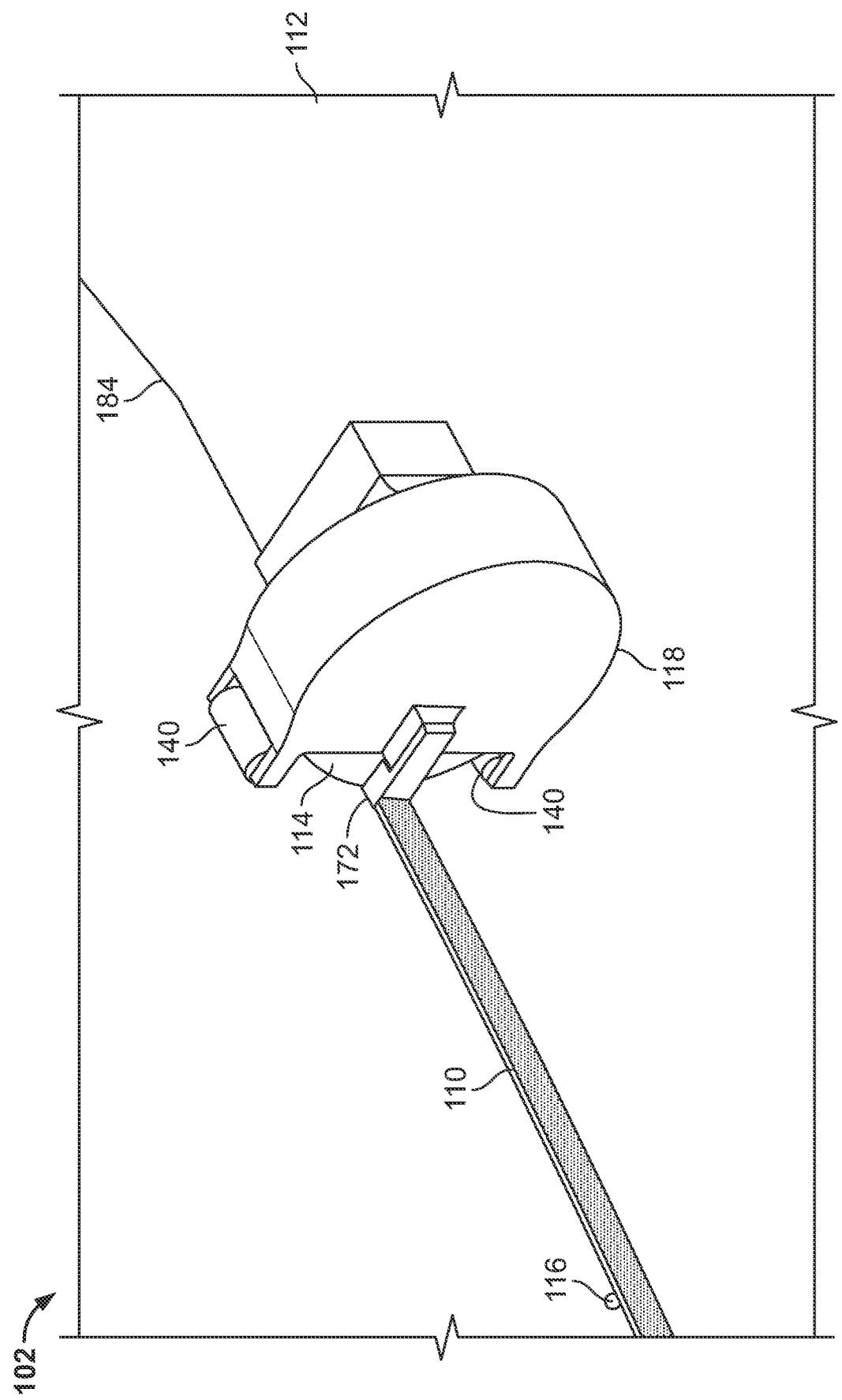

DETERMINING A VOLUME OF A TANK

TECHNICAL FIELD

This disclosure relates to determining a volume of a tank, in particular, by using a tape measure assembly.

BACKGROUND

Tanks contain voids which store a quantity of a fluid. Some tanks store fluids such as liquids and gases. Some fluids stored in tanks can include hydrocarbons such as oil and natural gas or other fluids such as water. Hydrocarbons and water can be removed from geologic formations of the Earth and flowed to tanks where they are stored. Tank volume can change over time. In order to determine a volume of the tank, the dimensions of the tank can be measured.

SUMMARY

This disclosure describes systems and methods related to determining a volume of a tank. Tanks for oil storage can be made from either nonmetallic or metallic materials which, in some cases, can shrink or expand. Sometimes, during shrinking and expanding of tank materials, the volume of the tank can increase or decrease. This approach determines a volume of a tank.

In one aspect, determining a volume of a tank includes attaching a measuring tape by multiple magnets to a first location of the tank. The method includes measuring, by the measuring tape, a first circumference of the tank at the first location of the tank. The method includes recording a value of the first circumference. The method includes rotating multiple wheels coupled to the measuring tape. The method includes, responsive to rotating the multiple wheels, moving the measuring tape from the first location to a second location of the tank. The method includes measuring a second circumference of the tank at the second location. The method includes recording a value of the second circumference. The method includes, based on the value of the first circumference and the value of the second circumference, calculating the volume of the tank.

In some embodiments, the second location is farther from a surface of the Earth than the first location.

In some embodiments, moving from the first location to the second location includes moving in an upward direction.

In some embodiments, measuring the first circumference and the second circumference includes moving a side attachment sub-assembly coupled to a first end of the measuring tape from a holder sub-assembly coupled to a second end of the measuring tape and extending the measuring tape about a portion of at least one of the first circumference or the second circumference. In some cases, the portion of the circumference includes the entire circumference of the tank. In some cases, contacting the side attachment sub-assembly to the holder sub-assembly about the portion of at least one of the first circumference or the second circumference. In some cases, extending the measuring tape about the portion of the at least one of the first circumference or the second circumference includes rolling the measuring tape across multiple magnetic rollers coupled to the measuring tape.

In some embodiments, calculating the volume of the tank includes generating a three dimensional model of the tank.

In some embodiments, the tank includes a fluid.

In another aspect, a tape measure assembly measures an object. The tape measure assembly has a holder sub-assembly, a measuring tape, a side attachment sub-assembly, and a controller. The holder sub-assembly includes a first enclosure, a first wheel coupled to the enclosure, and a first magnet positioned in the holder sub-assembly. The measuring tape is coupled to the enclosure by a first end of the measuring tape. The side attachment sub-assembly is coupled to a second end of the measuring tape. The attachment sub-assembly includes a second enclosure, a second wheel coupled to the second enclosure, and a second magnet positioned in the side attachment sub-assembly. The controller is operatively coupled to the holder sub-assembly, the measuring tape, and the side attachment sub-assembly. The controller performs operations including measuring multiple dimensions of the object. Based on the values of the multiple dimensions, the controller performs operations including calculating a volume of the object.

In some embodiments, the multiple dimensions include multiple portions of a circumference of the object.

In some embodiments, the multiple dimensions include a first circumference at a first location of the object and a second circumference at a second location different that the first location of the object.

In some embodiments, the first magnet is positioned on the first wheel and the second magnet is positioned on the second wheel.

In some embodiments, the first magnet is positioned in a first chassis of the first enclosure and the second magnet is positioned in a second chassis of the second enclosure.

In some embodiments, the first wheel and the second wheel includes magnetic omni-directional wheels.

In some embodiments, a first motor is coupled to the first wheel and a second motor is coupled to the second wheel.

In some embodiments, the tape measure assembly further includes multiple caster wheels coupled to the first enclosure and the second enclosure.

In some embodiments, the measuring tape includes multiple magnetic rollers coupled to a first surface of the measuring tape. The first surface faces the object. The magnetic rollers are rotatable as the measuring tape extends across a surface of the object.

In some embodiments, the measuring tape includes a capacitive encoder having multiple tracked copper segments extending across a surface of the measuring tape and multiple linear copper segments. A movement of the multiple tracked copper segments relative to the linear copper segments generates a capacitive charge correlating to the dimensions of the object. In some cases, the capacitive encoder is a capacitive linear encoder.

In some embodiments, the tape measure assembly further includes a sensor to sense a height of the tape measure assembly relative to the surface of the Earth and transmit a signal representing the height to the controller.

In another aspect, a method for determining a volume of a tank includes attaching a wire spool sub-assembly to a first circumference at a first location of the tank. The wire spool sub-assembly includes a first set of magnetic wheels and a set of wires. A first end of the set of wires is coupled to a spool of wire spool sub-assembly. The method includes extending a wire end sub-assembly having a third set magnetic wheels about the first circumference of the tank. The wire end sub-assembly is coupled to a terminating end of the set of wires. The method includes attaching multiple wire guide sub-assemblies having a second set magnetic wheels to the tank about the wires. The method includes deploying a roller tape measure sub-assembly along the wires. The method includes measuring the first circumference at the first location of the tank with the roller tape measure sub-assembly. The method includes recording a value of the first circumference at the first location of the tank with the roller tape measure sub-assembly. The method includes moving the wire spool sub-assembly, the wire guide sub-assembly, the wire end sub-assembly, and the roller tape measure sub-assembly from the first circumference of the first location of the tank to a second circumference of a second location of the tank. The second location is different than the first location. The method includes measuring the second circumference at the second location of the tank with the roller tape measure sub-assembly. The method includes recording a value of the second circumference at the second location of the tank. The method includes, based on the value of the first circumference and the value of the second circumference, calculating the volume of the tank.

In some embodiments, the second location is farther from a surface of the Earth than the first location.

In some embodiments, moving from the first location to the second location includes moving in an upward direction.

In some embodiments, measuring the first circumference and the second circumference includes aligning the wires in a horizontal plane.

In some embodiments, calculating the volume of the tank includes generating a three dimensional model of the tank.

In another aspect, a tape measure assembly measures a tank. The tape measure assembly includes a wire spool sub-assembly, multiple wire guide sub-assemblies, a wire end sub-assembly, a roller tape measure sub-assembly, and a controller. The wire spool sub-assembly has multiple wires extendable from wire spool sub-assembly around a circumference of the tank and a first set magnetic wheels coupled to the wire spool sub-assembly. The multiple wire guide sub-assemblies have a u-shaped body positioned about and coupled to the wires and a second set of magnetic wheels coupled to the body. The wire end sub-assembly is coupled to a terminating end of the wires. The wire end sub-assembly has a third set of magnetic wheels. The roller tape measure sub-assembly is coupled to the wires and is movable along the wires. The controller is operably coupled to the wire spool sub-assembly, the wire guide sub-assemblies, the wire end sub-assembly, and the roller tape measure sub-assembly.

In some embodiments, the controller performs operations including positioning the wire spool sub-assembly, the wire guide sub-assemblies, and the wire end sub-assembly about the circumference at a first location of the tank. The controller performs operations including measuring, by the roller tape measure sub-assembly, a first circumference of the first location of the tank. The controller performs operations including recording a value of the first circumference at the first location. The controller performs operations including moving each of the wire spool sub-assembly, the wire guide sub-assembly, and the wire end sub-assembly from the first circumference of the first location to a second circumference of a second location. The second location is different that the first location. The controller performs operations including measuring the second circumference at the second location of the tank. The controller performs operations including recording a value of the second circumference at the second location. The controller performs operations including, based on the value of the first circumference and the value of the second circumference, calculating a volume of the tank.

In some embodiments, the controller further performs operations including moving each of the wire spool sub-assembly, the wire guide sub-assembly, and the wire end sub-assembly from the first circumference of the first location to the second circumference of the second location in an upward direction.

In some embodiments, the controller further performs operations including aligning the wires in a horizontal plane.

In some embodiments, the controller further performs operations including generating a three dimensional model of the tank.

In some embodiments, a roller of the roller tape measure moves the roller tape measure relative to the surface of the tank.

In some embodiments, the roller tape measure further includes a sensor to sense a height of the tape measure assembly relative to the a surface of the Earth and transmit a signal representing the height to the controller.

Implementations of the present disclosure can realize one or more of the following advantages. These systems and methods can improve personnel safety. For example, determining a volume of a tank by using a tape measure assembly can reduce the number of personnel required to measure a tank in an industrial environment. For example, personnel can operate the tape measure assembly from a surface of the Earth, and not have to build scaffolding around a tank. These systems and methods can reduce the time to determine a volume of the tank. For example, a tank can be measured from the external surface, no longer requiring the fluid to be drained from a tank and the tank to be subsequently entered by personnel for tank measurement.

These systems and methods can improve measurement accuracy of tank volumes. For example, human error in taking and recording tank measurements can be reduced. For example, tape measurement dimensional error can be reduced compared to a personnel held tape measure.

These systems and methods also can increase tank operational time. For example, when a tank no longer has to be drained for measurement, it can remain in operation for an increased amount of time.

These systems and methods can improve accuracy of a transferred tank volume. For example, increasing the accuracy of tank measurements can more precisely quantify the amount of volume of fluid in the tank which has been transferred to a customer.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure relates to determining a volume of a tank. This approach determines a volume of a tank by measuring multiple circumferences of the tank with a measuring tape assembly and calculating the volume of the tank based on the circumferences of the tank. The tank is measured by attaching a measuring tape having multiple magnets to a first location of the tank and measuring a first circumference of the tank at the first location of the tank. A value of the first circumference is recorded. Multiple wheels coupled to the measuring tape rotate, moving the measuring tape from the first location to a second location of the tank. A second circumference of the tank is measured at the second location. A value of the second circumference is recorded. Based on the value of the first circumference and the value of the second circumference, the volume of the tank is calculated.

Tanks can store a quantity of a liquid. One type of tanks that store quantities of liquid are custody transfer tanks. Custody transfer tanks temporarily store liquid hydrocarbons prior to transferring them from an operator (the owner of the tank) to a purchaser. The calculated volume of custody transfer tanks is one of the primary inputs used to determine the quantity of liquid hydrocarbons transferred to the purchaser. Custody transfer tanks can be measured to generate a tank capacity table, which list the volume contained in the tank along the full height of the tank (relationship between height (usually in cm) and volume at that height (in barrels). The operator uses the capacity table that was generated from the most recent measurements of the tanks to determine the transferred volume. The difference in the tank level between the beginning and ending of any quantity transfer represents the transferred volume. Then the seller charges the buyer for the volume transferred. Due to the extensive utilization and high turnaround cycles of custody duty tanks, some custody transfer tanks can expand faster than an expected expansion rate. Consequently, the increase in the custody duty tanks volume due to material expansion may not be detected, causing the quantity of hydrocarbons transferred to the purchaser to be under-estimated. Over a period of time, the difference between the actual transfer custody tank volume and measured custody transfer tank as reported in the tank capacity table can accumulate, leading to increased unintentional hydrocarbon transfer to the purchaser and financial loss to the operator.

Figure 1A:
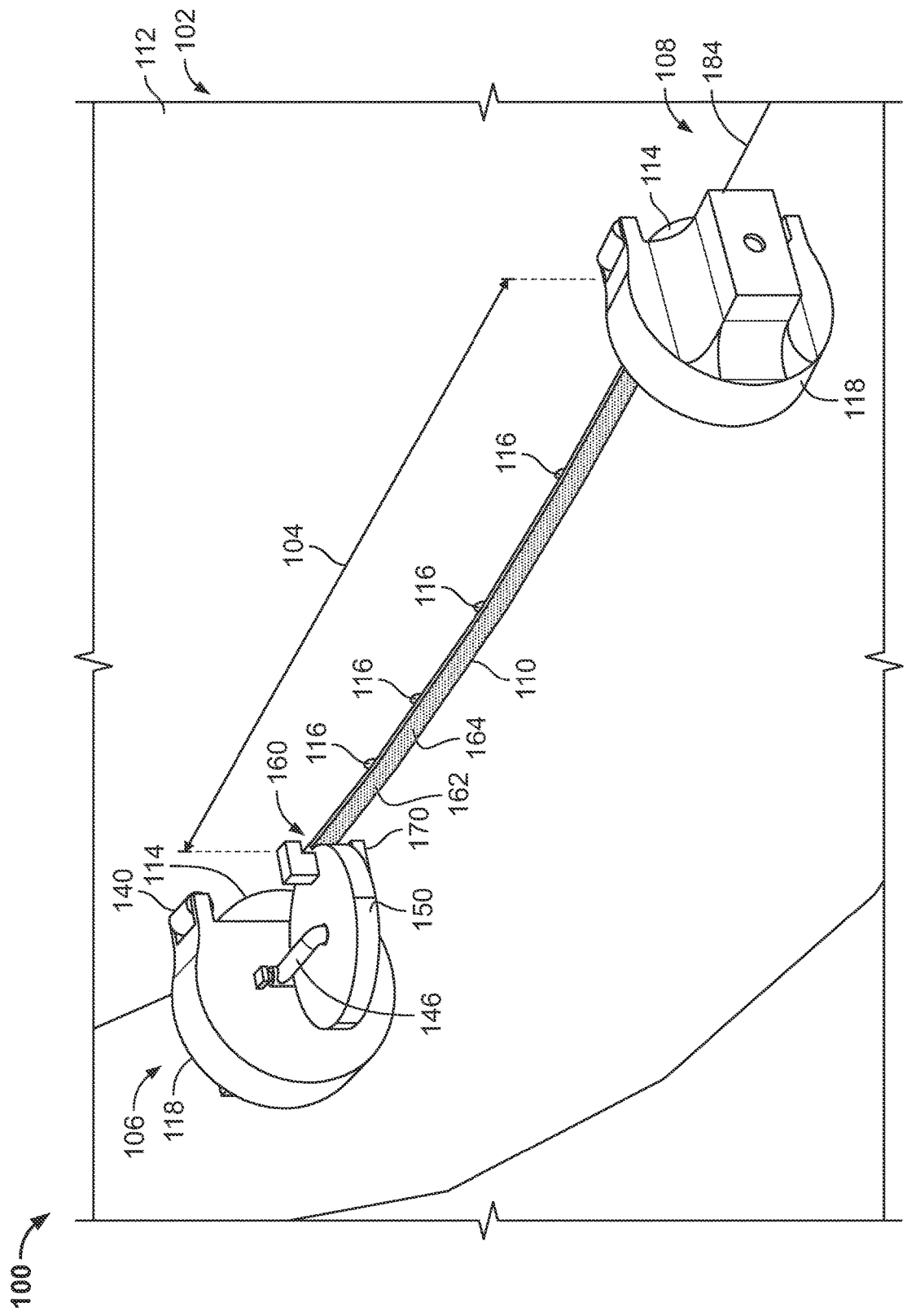
FIG. 1A is a schematic view of an example tape measure assembly positioned on a tank according the implementations of the present disclosure.

FIG. 1A is a schematic view of an example tape measure assembly 100 positioned on a tank 102 according the implementations of the present disclosure. The tank 102 can be a custody transfer tank. The tank 102 can be constructed from steel or a steel alloy. The tank 102 can be magnetic. The tape measure assembly 100 measures multiple dimensions 104 of the tank 102 and based on values of the dimensions 104, calculates a volume of the tank 102. The tape measure assembly 100 has a holder sub-assembly 106, a side attachment sub-assembly 108, and a measuring tape 110 coupled to and extending between the holder sub-assembly 106 and the side attachment sub-assembly 108. The tape measure assembly 100 has magnets, described in more detail below, to couple the holder sub-assembly 106, the side attachment sub-assembly 108, and the measuring tape 110 to an outer surface 112 of the tank 102. For example, in the holder sub-assembly 106 and the side attachment sub-assembly 108 of the tape measure assembly 100 shown in FIG. 1A, the magnets can be magnetic wheels 114, described in more detail later. Also, in the measuring tape 110, the magnets can be magnetic rollers 116, described in more detail later. The magnetic wheels 114 and the magnetic rollers 116 can couple the tape measure assembly 100 to the outer surface 112 of the tank 102.

Figure 1B:
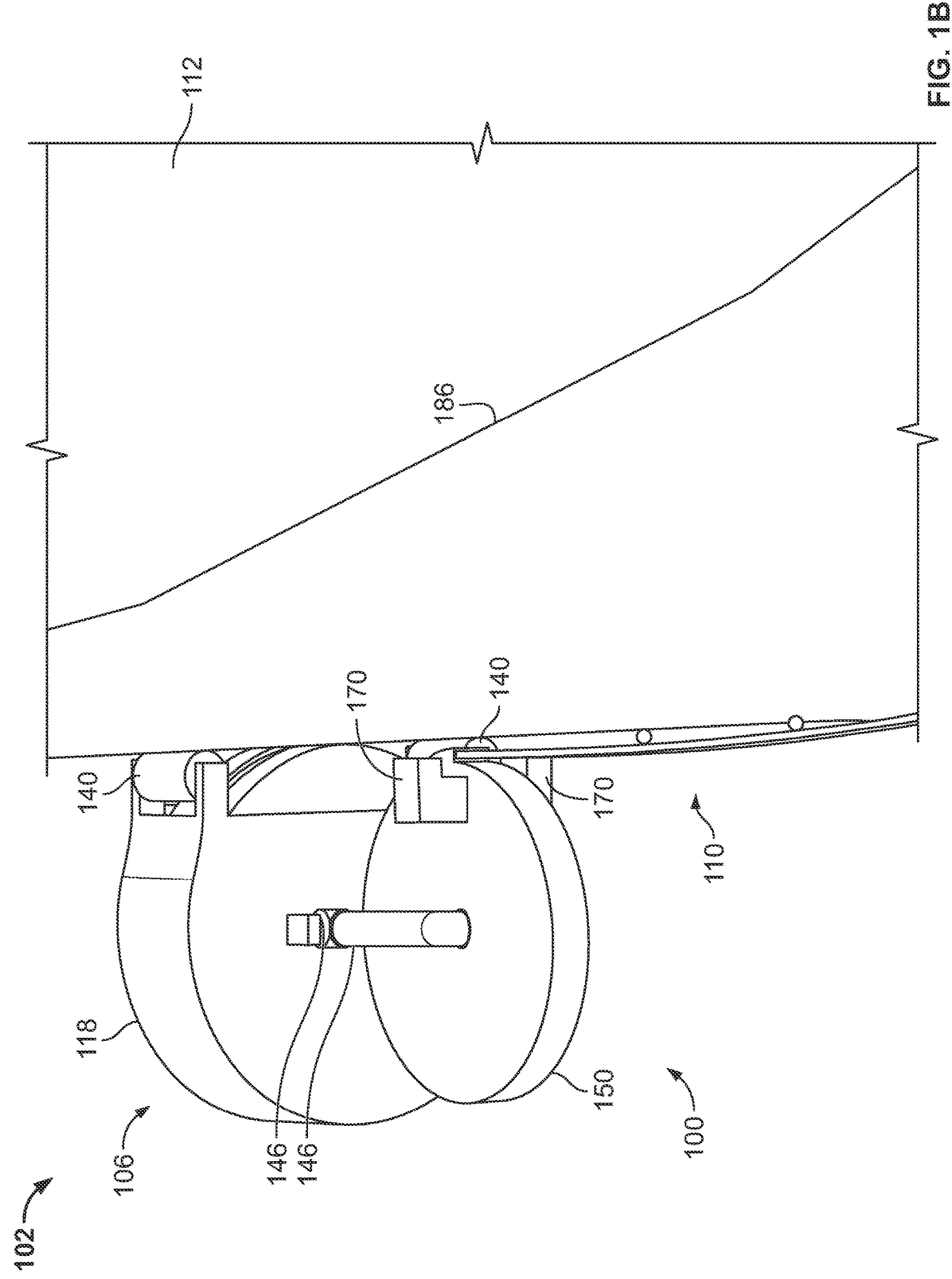
FIG. 1B is a schematic view of a holder sub-assembly of the tape measure assembly of FIG. 1A.
Figure 1C:
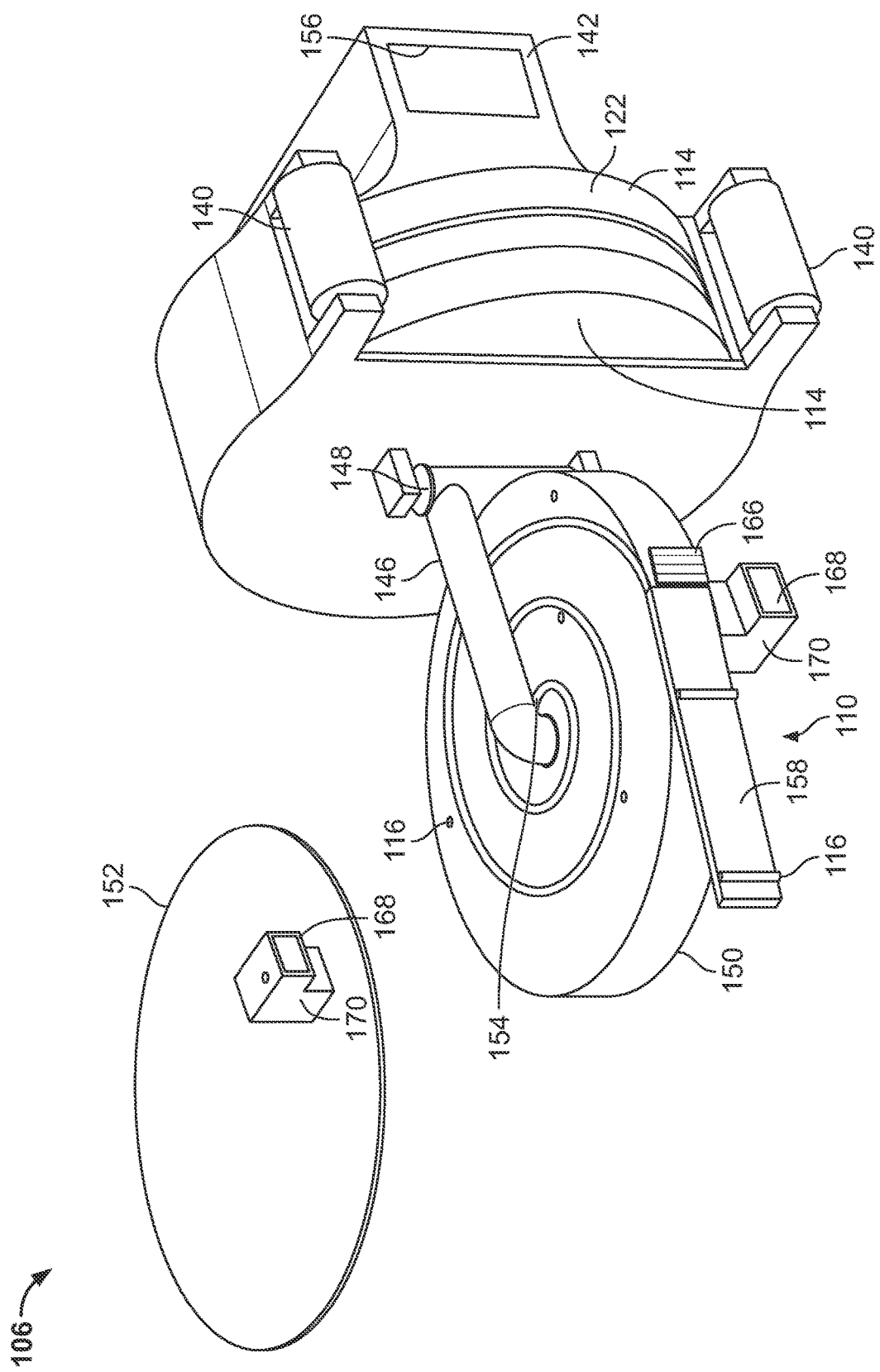
FIG. 1C is a schematic bottom view of the holder sub-assembly of FIG. 1B.
Figure 1D:
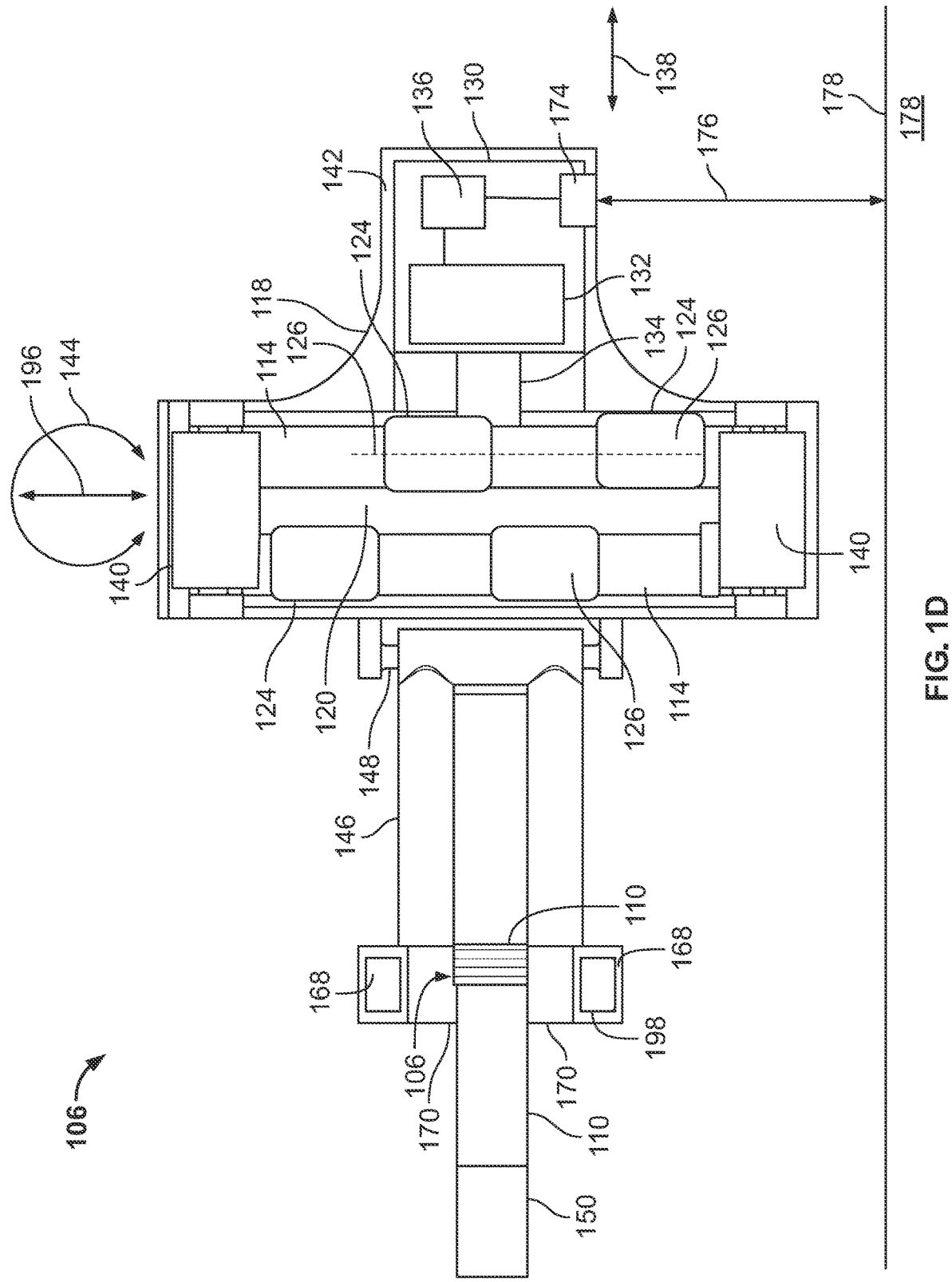
FIG. 1D is a bottom schematic view of the holder sub-assembly of FIG. 1B.

FIG. 1B is a schematic view of the holder sub-assembly 106 of the tape measure assembly 100 of FIG. 1A. FIG. 1C is a schematic bottom view of the holder sub-assembly 106 of FIG. 1B. FIG. 1D is a bottom schematic view of the holder sub-assembly 106 of FIG. 1C. Referring to FIGS. 1A-1D, the holder sub-assembly 106 has an enclosure 118. Referring to FIGS. 1C-1D, the enclosure 118 has a void 120 in which one or more of the wheels 114, described in more detail below, are positioned. The wheels 114 are coupled to the enclosure 118. The enclosure 118 can be constructed of a metal or a polymer. For example, the enclosure 118 can be steel, aluminum, or an alloy. Alternatively or in addition, the enclosure 118 can be constructed of a non-metallic material. For example, the enclosure 118 can be polymer such as a high density polyethylene. The non-metallic enclosure 118 can reduce an impact on a magnetic flux from the wheels 114 as the magnetic flux passes through the enclosure 118. The enclosure 118 can also be referred to as a chassis.

The wheels 114 are positioned within the void 120 of the enclosure 118. The wheels 114 partially extend from the enclosure 118 to contact the outer surface 112 of the tank 102. In some cases, an outer surface 122 of the wheels 114, shown in FIG. 1C, is textured. For example, the outer surface 122 can be extruded. The outer surface 112 can be extruded so that the magnetic flux from the wheels 114 is not interrupted and the extrusion does not damage the tank 102. In some cases, a rubber coating (not shown) is positioned about the outer surface 122 of the wheels 114 to grip and/or provide traction as the wheel 114 moves across the outer surface 112 of the tank 102. In some cases, the wheels 114 can be magnetic. The magnetic wheels 114 magnetically couple to the outer surface 112 of the tank 102 to couple the holder sub-assembly 106 and move the holder sub-assembly 106 across the outer surface 112 of the tank 102. The rubber coating can be arranged to not hinder the magnetic flux from the wheels 114 to attach the enclosure 118 to the tank 102. In some cases, the magnetic wheels 114 can rotate in opposite directions to rotate the holder sub-assembly 106. For example, the holder sub-assembly 106 can rotate in the direction of arrows 144. In some cases, the wheels 114 can rotate in the same direction, causing the holder sub-assembly 106 to move across the outer surface 112 of the tank 102.

Referring to FIG. 1D, in some cases, the wheels 114 are omni-directional magnetic wheels. Magnetic omni-directional wheels 114 have multiple magnets 124 with rounded outer surfaces 126 arrayed along the outer surface 122 of the wheels 114. Magnetic omni-directional wheels 114 are rounded such that the rounded outer surfaces 126 allow the magnets 124 to rotate about a longitudinal axis 128 of the magnets 124, which enables the holder sub-assembly 105 to move in the direction of arrow 138, perpendicular to the longitudinal axis 128.

Referring to FIG. 1C, the holder sub-assembly 106 can include a magnet 156 positioned on a bottom surface 142 of the enclosure 118, that is, the magnet 156 can be positioned in the chassis. The magnet 156 can magnetically couple the holder sub-assembly 106 to the outer surface 112 of the tank 102. When the holder sub-assembly 106 includes the magnet 156, the wheels 114 can be either magnetic or non-magnetic. In some cases, the enclosure 118 is magnetized by permanent magnets or electromagnets (not shown).

Referring to FIG. 1D, the holder sub-assembly 106 has a motor box 130 positioned within the enclosure 118. The motor box includes a motor 132 to power, that is, provide a rotational force, to the wheels 114. The motor 132 is mechanically coupled to the wheels 114 by a shaft 134. The shaft 134 translates the rotational force from the motor 132 to the wheels 114 to rotate the wheels 114. The motor box 130 includes a controller 136 (described in more detail below) to operatively control the wheels 114 via the motor 132 and the extending and retracting of the measuring tape 110 by controlling the position of the side attachment sub-assembly 108 in a similar manner to the holder sub-assembly, as described in reference to FIGS. 1A and 1E-1G.

As shown in FIGS. 1A-1D, the holder sub-assembly 106 has one or more caster wheels 140 coupled to the bottom surface 142 of the enclosure 118. The caster wheels 140 engage the outer surface 112 of the tank 102 and rotate in the direction of arrows 196 in response to movement of the holder sub-assembly 106. The caster wheels 140 can reduce rotation (in the direction of arrows 144) of the holder sub-assembly 106 while the holder sub-assembly 106 traverses across the outer surface 112 of the tank 102.

A hinge 146 couples the measuring tape 110 to the holder sub-assembly 106. The hinge 146 can rotate about a hinge shaft 148 to maintain the measuring tape 110 in contact with the outer surface 112 of the tank 102 as the holder sub-assembly 106 moves across the outer surface 112 of the tank 102.

The measuring tape 110 has a measuring tape holder 150 in which the measuring tape 110 is positioned. Referring to FIG. 1C, showing a side surface 152 of the measuring tape holder 150 removed, the measuring tape 110 is spiral wrapped inside the measuring tape holder 150. The measuring tape 110 has a first end 154 internally mechanically coupled to the measuring tape holder 150.

The measuring tape 110 has magnetic rollers 116 coupled to a first surface 158 of the measuring tape 110. The first surface 158 of the measuring tape 110 faces the outer surface 112 of the tank 102. When the measuring tape 110 is extended from the measuring tape holder 150, the magnetic rollers 116 contact the outer surface 112 of the tank 102. The magnetic rollers 116 rotate as the measuring tape 110 extends across the outer surface 112 of the tank 102. The magnetic rollers 116 can conform a curvature of the measuring tape 110 to a curvature of the outer surface 112 of the tank 102.

The measuring tape 110 has a capacitive encoder 160 which determines the dimension 104 as the measuring tape 110 extends from the measuring tape holder 150. The capacitive encoder 160 includes multiple tracked copper segments 162 coupled to and extending across a second surface 164 of the measuring tape 110. The capacitive encoder 160 includes multiple linear copper segments 166. The multiple linear copper segments 166 are positioned on the measuring tape holder 150. The multiple linear copper segments 166 are fixed to the measuring tape holder 150. When the measuring tape 110 extends and retracts from the measuring tape holder 150, a movement of the tracked copper segments 162 relative to the fixed multiple linear copper segments 166 generates a capacitive charge correlating to the measurement of the dimension 104. When the tracked copper segments 162 and the linear copper segments 166 are arranged in this manner, this can be referred to as a linear capacitive encoder. In some cases, the capacitive encoder 160 measures the dimension 104 within plus/minus 0.001 inches.

The capacitive encoder 160 is electronically coupled to the controller 136. The capacitive encoder 160 transmits a signal representing the measurement of the dimension 104 to the controller 136.

Alternatively, the capacitive encoder can be arranged as a rotary capacitive encoder (not shown). The rotary capacitive encoder has a first wheel with the multiple linear copper segments 166 arranged in a circular pattern about the first wheel. The first wheel is positioned inside of the measuring tape holder 150. The first wheel is in fixed position, that is, the first wheel does not rotate within the measuring tape holder 150. The rotary capacitive encoder has a second wheel coupled to the measuring tape 110. The second wheel has the tracked copper segments 162 arranged in a circular pattern about second wheel. The second wheel is rotatable. When the measuring tape 110 extends and retracts from the measuring tape holder 150, a movement of the tracked copper segments 162 on the second wheel relative to the fixed multiple linear copper segments 166 on the first wheel generates a capacitive charge correlating to the measurement of the dimension 104. The rotary capacitive encoder can measure the rotational change of the measuring tape 110 around a tape spool. In this manner, a change in linear displacement of the measuring tape 110 is proportional to a change of the spool angle.

The measuring tape holder 150 can include multiple magnets 168 mechanically coupled to a bottom surface 198 of the measuring tape holder 150. When the measuring tape holder 150 is positioned on the outer surface 112 of the tank 102, the multiple magnets 168 magnetically couple the measuring tape holder 150 to the tank 102. The measuring tape holder 150 can include arms 170 mechanically coupled to and extending from the side surfaces 152. The magnets 168 can be positioned on the arms 170 extended away from the side surfaces 152.

Figure 1F:
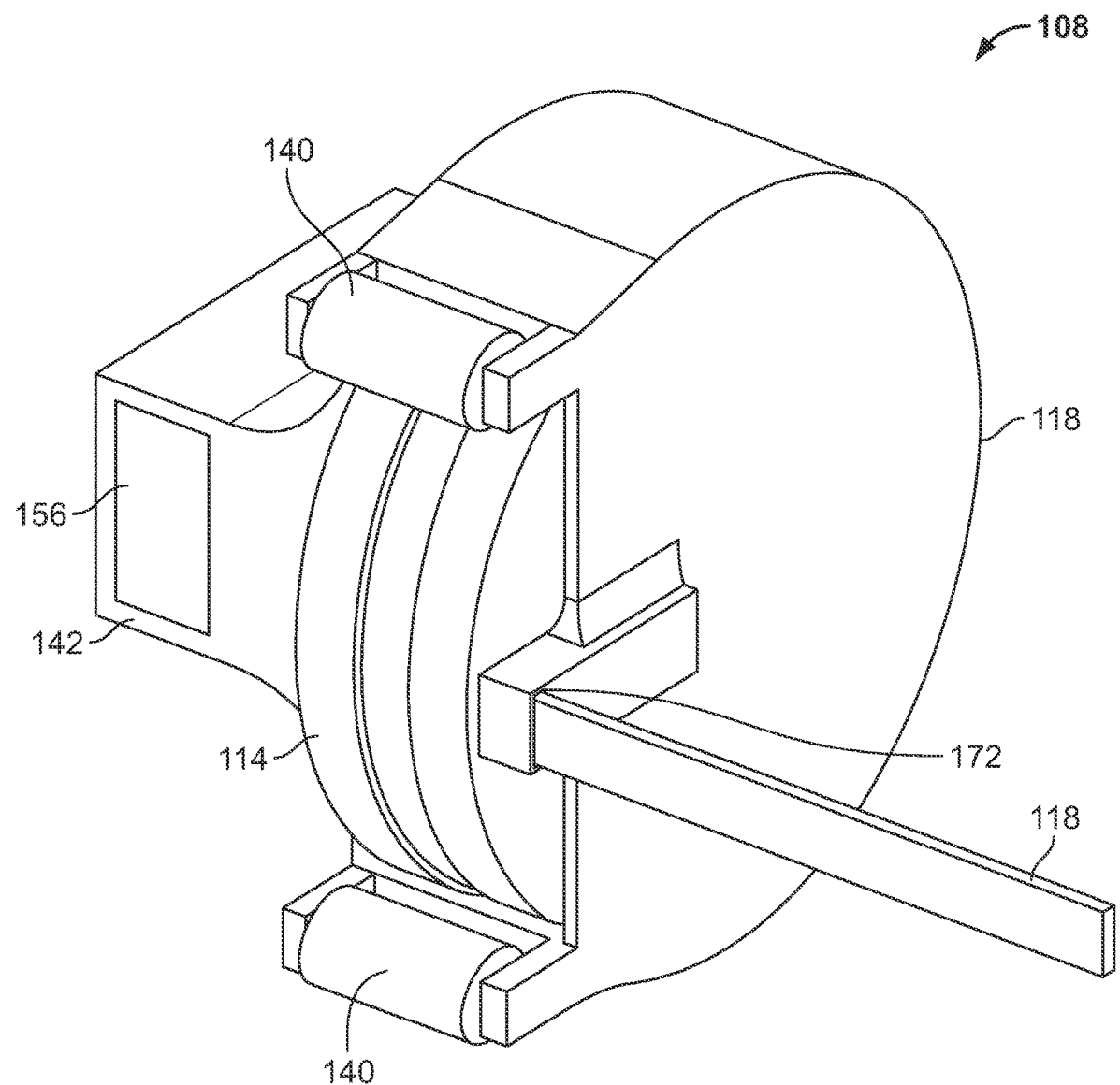
FIG. 1F is a schematic bottom view of the side attachment sub-assembly of FIG. 1E.
Figure 1G:
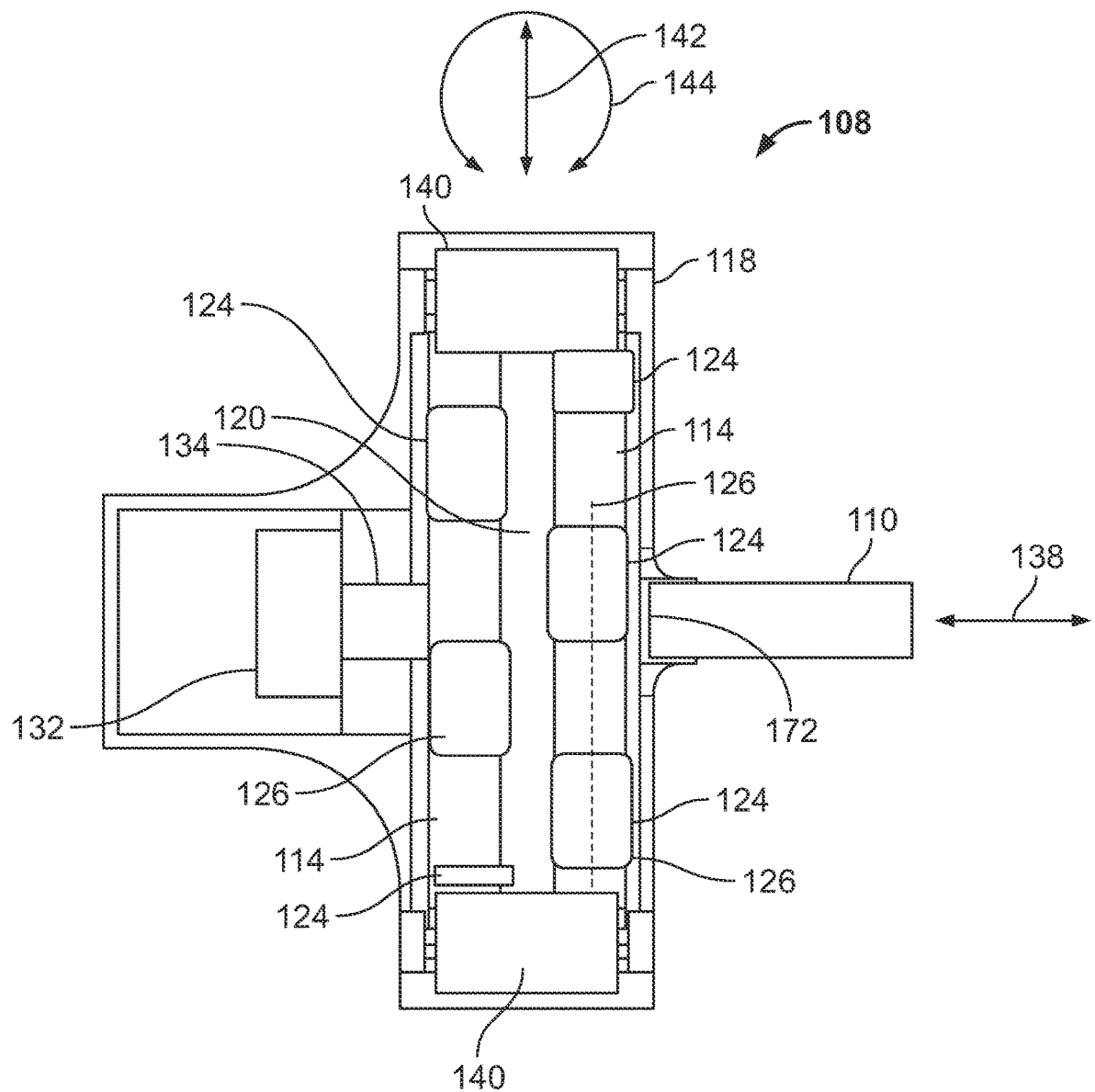
FIG. 1G is a bottom schematic view of the side attachment sub-assembly of FIG. 1E.

FIG. 1E is a schematic view of a side attachment sub-assembly of the tape measure assembly of FIG. 1A. FIG. 1F is a schematic bottom view of the side attachment sub-assembly of FIG. 1E. FIG. 1G is a bottom schematic view of the side attachment sub-assembly of FIG. 1E. Referring to FIGS. 1A and 1E-1G, the side attachment sub-assembly 108 is generally similar to the holder sub-assembly 106. The side attachment sub-assembly 108 has the enclosure 118 with the void 120 in which one or more of the wheels 114 are positioned. The wheels 114 are coupled to the enclosure 118. A second end 172 of the measuring tape 110 is mechanically coupled to the enclosure 118.

Referring to FIGS. 1F-1G, the wheels 114 are positioned within the void 120 of the enclosure 118 of the side attachment sub-assembly 108. The wheels 114 partially extend from the enclosure 118 to contact the outer surface 112 of the tank 102. In some cases, the wheels 114 of the side attachment sub-assembly 108 can be magnetic. The magnetic wheels 114 magnetically couple to the outer surface 112 of the tank 102 to couple the side attachment sub-assembly 108 and move the side attachment sub-assembly 108 across the outer surface 112 of the tank 102. In some cases, the magnetic wheels 114 can rotate in opposite directions to rotate the side attachment sub-assembly 108. For example, the side attachment sub-assembly 108 can rotate in the direction of arrows 144. In some cases, the wheels 114 can rotate in the same direction, causing the side attachment sub-assembly 108 to move across the outer surface 112 of the tank 102. Referring to FIG. 1G, in some cases, the wheels 114 are omni-directional magnetic wheels. The magnetic omni-directional wheels 114 have multiple magnets 124 with rounded outer surfaces 126 arrayed along the outer surface 122 of the wheels 114. Magnetic omni-directional wheels 114 are rounded such that the rounded outer surfaces 126 allow the magnets 124 to rotate about a longitudinal axis 128 of the magnets 124, which enables the side attachment sub-assembly 108 to move in the direction of arrow 138, perpendicular to the longitudinal axis 128.

Referring to FIG. 1F, the side attachment sub-assembly 108 can include the magnet 156 positioned on a bottom surface 142 of the enclosure 118, that is, the magnet 156 can be positioned in the chassis. The magnet 156 can magnetically couple the side attachment sub-assembly 108 to the outer surface 112 of the tank 102. When the side attachment sub-assembly 108 includes the magnet 156, the wheels 114 can be either magnetic or non-magnetic.

Referring to FIG. 1G, the side attachment sub-assembly 108 has the motor box 130 positioned within the enclosure 118. The motor box includes another motor 132 to power, that is, provide the rotational force, to the wheels 114. The motor 132 is mechanically coupled to the wheels 114 by another shaft 134. The shaft 134 translates the rotational force from the motor 132 to the wheels 114 to rotate the wheels 114. The motor box 130 is electrically coupled to the controller 136 positioned in the holder sub-assembly 106 to operatively control the wheels 114 via the motor 132 which controls the position of the side attachment sub-assembly 108 to extend and retract the measuring tape 110. For example, the controller 136 can be electrically connected to the motor box 130 by a control and power cable (not shown) extending along the measuring tape 110 from the holder sub-assembly 106 to the side attachment sub-assembly 108. For example, the controller 136 of the holder sub-assembly 106 can connect by a wireless connection such as Bluetooth to operate the side attachment sub-assembly 108.

As shown in FIGS. 1A and 1E-1G, the side attachment sub-assembly 108 has one or more caster wheels 140 coupled to the bottom surface 142 of the enclosure 118. The caster wheels 140 engage the outer surface 112 of the tank 102 and rotate in the direction of arrows 196 in response to movement of the side attachment sub-assembly 108. The caster wheels 140 can reduce rotation (in the direction of arrows 144) of the side attachment sub-assembly 108 while the side attachment sub-assembly 108 traverses across the outer surface 112 of the tank 102.

Referring to FIG. 1D, the holder sub-assembly 106 has a sensor 174 to sense a condition of the holder sub-assembly 106. In the example holder sub-assembly 106, the sensor 174 senses a height 176 of the holder sub-assembly 106 from a surface 178 of the Earth 180. The sensor 174 transmits a signal representing a value of the height 176 to the controller 136.

Referring to FIGS. 1A-1G, the controller 136 is operatively coupled to the holder sub-assembly 106, the measuring tape 110, and the side attachment sub-assembly 108. The controller 136 moves the holder sub-assembly 106 and the side attachment sub-assembly 108 to extend and retract the measuring tape 110 to measure the dimensions 104 of the tank 102. Based on the values of the dimensions 104, the controller 136 calculating a volume of the tank 102.

Figure 1H:
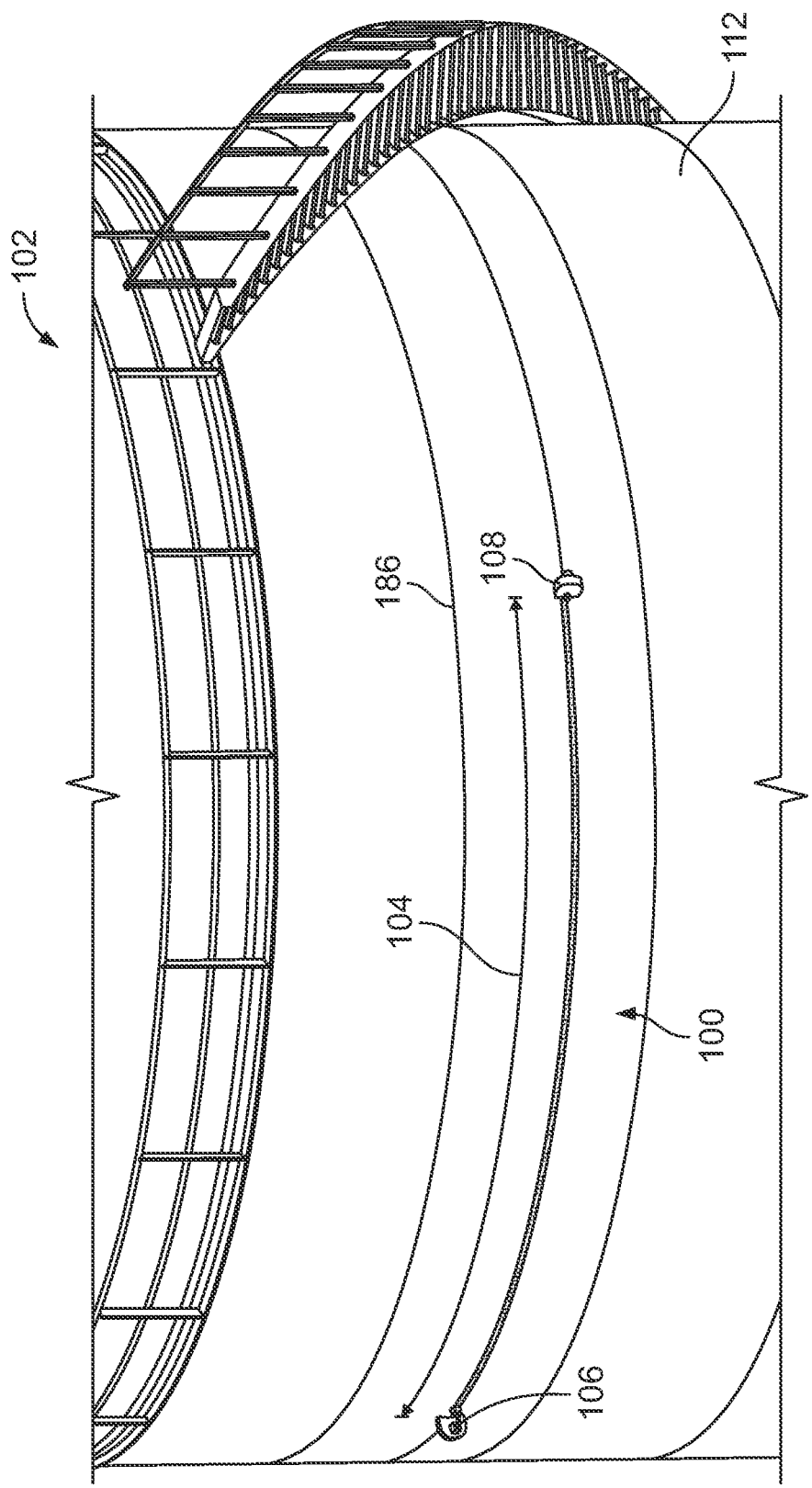
FIG. 1H is a schematic view of the tape measure assembly measuring a portion of the tank of FIG. 1A.
Figure 1:
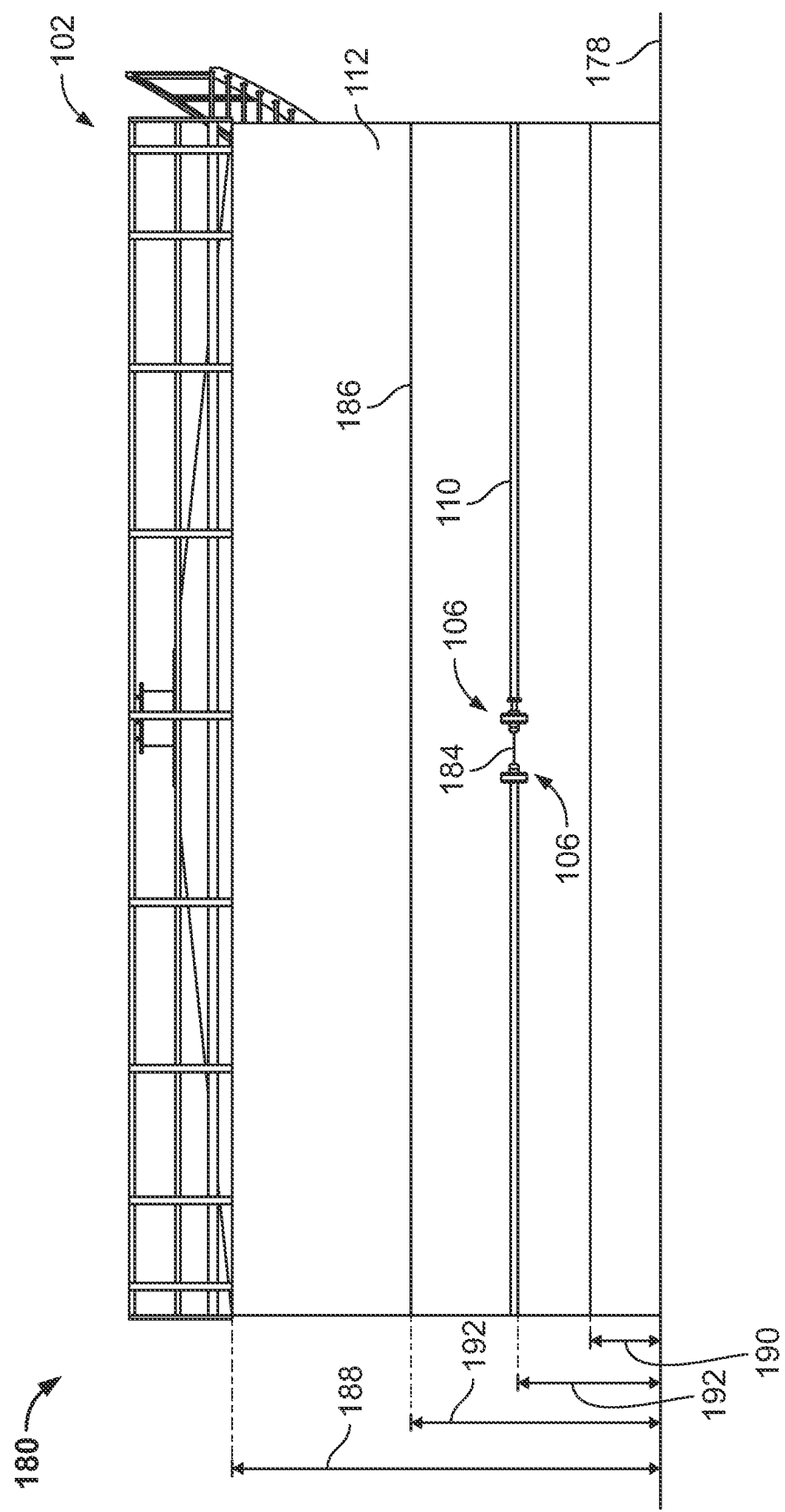
FIG. 1E is a schematic view of a side attachment sub-assembly of the tape measure assembly of FIG. 1A.
FIG. 1I is a front schematic view of the side attachment sub-assembly of the tape measure assembly approaching the holder sub-assembly of FIG. 1A.

FIG. 1H is a schematic view of the tape measure assembly measuring a portion of the tank of FIG. 1A. Referring to FIGS. 1A, 1D, 1E, 1G, and 1H, the tape measure assembly 100 measures a first portion 182 of the tank 102. The first portion 182 can also be referred to as a first segment. The first portion 182 corresponds to the dimension 104 of FIG. 1H. The portion 182 is part of a first circumference 184 of the tank 102. The tape measure assembly 100 can measure multiple portions 182 around first circumference 184 of the tank 102, then add the multiple portions 182 to measure the value of the first circumference 184 of the tank 102. For example, in some cases, the measuring tape 110 can only extend to about 25% of the tank 102 first circumference 184, so four independent runs of the measurements are done for each quarter of the first circumference 184.

FIG. 1I is a front schematic view of the side attachment sub-assembly of the tape measure assembly approaching the holder sub-assembly of FIG. 1A. Referring to FIG. 1I, the side attachment sub-assembly 108 has moved around the first circumference 184 of the tank 102 from the holder sub-assembly 106. The side attachment sub-assembly 108 can continue to move along the first circumference 184 to measure the entire circumference 184 in a single measurement.

To operate the tape measure assembly 100, an operator (not shown) can place the tape measure assembly 100 on the outer surface 112 of the tank 102 on or near the first circumference 184. The controller 136 sends a signal to the motors 132 of the holder sub-assembly 106 and the side attachment sub-assembly 108 to rotate the wheels 114 to move the holder sub-assembly 106 and the side attachment sub-assembly 108 to the first circumference 184 to be measured. Once both of the holder sub-assembly 106 and the side attachment sub-assembly 108 are positioned on the first circumference 184, the controller 136 sends another signal to the motor 132 of the side attachment sub-assembly 108 to rotate the wheels 114 to rotate to move the side attachment sub-assembly 108 along the first circumference 184. As the side attachment sub-assembly 108 moves along the first circumference 184, the measuring tape 110 extends from the measuring tape holder 150. The magnetic rollers 116 magnetically couple to the outer surface 112 of the tank 102 to maintain the measuring tape 110 on the first circumference 184.

As the measuring tape 110 extends from the measuring tape holder 150, the movement of the tracked copper segments 162 of the capacitive encoder 160 relative to the fixed multiple linear copper segments 166 generates the capacitive charge correlating to the measurement of the dimension 104. The capacitive encoder 160 sends a signal representing a value of the measurement of the dimension 104 to the controller 136. The controller 136 records the value of the measurement of the first circumference 184. When the tape measure assembly 100 is measuring the portion 182 of the first circumference 184, the capacitive encoder 160 sends multiple signals representing the values of each of the multiple portion of the first circumference 184 to the controller 136.

The controller 136 then sends a signal to the side attachment sub-assembly 108 to rotate the wheels 114 to move the side attachment sub-assembly 108 toward the holder sub-assembly 106. When the side attachment sub-assembly 108 moves toward the holder sub-assembly 106, the measuring tape 110 retracts into the measuring tape holder 150.

Then the controller 136 sends a signal to the motors 132 of the holder sub-assembly 106 and the side attachment sub-assembly 108 to rotate the wheels 114 to move the holder sub-assembly 106 and the side attachment sub-assembly 108 to a second circumference 186, shown in FIGS. 1B, 1H, and 1I to be measured. The second circumference 186 can be in an upward direction, as shown by arrow 194 in FIG. 1H, from the first circumference 184. Once both of the holder sub-assembly 106 and the side attachment sub-assembly 108 are positioned on the second circumference 186, the controller 136 sends another signal to the motor 132 of the side attachment sub-assembly 108 to rotate the wheels 114 to rotate to move the side attachment sub-assembly 108 along the second circumference 186. As the side attachment sub-assembly 108 moves along the second circumference 186, the measuring tape 110 extends from the measuring tape holder 150. The magnetic rollers 116 magnetically couple to the outer surface 112 of the tank 102 to maintain the measuring tape 110 on the second circumference 186.

As the measuring tape 110 extends from the measuring tape holder 150, the movement of the tracked copper segments 162 of the capacitive encoder 160 relative to the fixed multiple linear copper segments 166 generates the capacitive charge correlating to the measurement of the dimension 104 of the second circumference 186. The capacitive encoder 160 sends a signal representing a value of the measurement of the dimension 104 to the controller 136. The controller 136 records the value of the measurement of the second circumference 186. When the tape measure assembly 100 is measuring the portion 182 of the second circumference 186, the capacitive encoder 160 sends multiple signals representing the values of each of the multiple portion of the second circumference 186 to the controller 136.

The tape measure assembly 100 measure multiple circumferences of the tank 102. For example, the tape measure assembly 100 can measure the first circumference 184 and the second circumference 186. The tape measure assembly 100 can measure three or more circumferences. For example, the tape measure assembly 100 can measure five, ten, twenty, or more circumferences.

The controller 136 calculates a volume of the tank 102 from the recorded values of the first circumference 184 and the second circumference 186. Calculating the volume of the tank 102 can include multiple one, two, or more of the measured circumferences. The volume of a tank can be calculated by multiplying a height 188, shown in FIG. 1I, by one of the circumferences, for example, the first circumference 184. The height 188 of the tank can be sense by the sensor 174. When the tape measure assembly 100 is positioned on the first circumference 184, the sensor can sense a height 190 of the first circumference 184 relative to the surface 178 of the Earth 180. When the tape measure assembly 100 is positioned on the second circumference 186, the sensor 174 can sense a height 192 of the second circumference 186 relative to the surface 178 of the Earth 180. The sensor 174 transmits signals representing the values of height 190 of the first circumference 184 and the height 192 of second circumference 186 to the controller 136. The controller 136 can then multiply each of the heights 190 and 192 by the first circumference 184 and the second circumference 186, respectively, to calculate the volume of the tank 102.

In some implementations, the controller 136 calculates a volume of the tank 102 by automating the manual strapping method according to an industry standard. The custody transfer tanks are used to temporarily store liquid hydrocarbons prior to transferring them to the purchaser. In some cases, the calibrated volume of these tanks is one of the primary inputs used to quantify how much volume is being transferred. The calculations can be performed in accordance with applicable International Standards Organization (ISO) and API standards, but with higher accuracy and precision. The volume of the tank can be determined by following the procedures of an API or ISO standards, for example, API 2.2 A, B, C, D and/or ISO 7507-1, 2, 3, 4/5). The circumference measurement methodology of API Standard 2.2 is shown in below in Table 1. Circumference Measurement Methodology from API 2.2A.

TABLE 1

| Circumference Measurement Methodology from API 2.2A | |
|---|---|
| Type of Tank Construction | Circumference Measurement Elevations |
| Welded Steel | One or More Rings 20 percent down from top of each ring whether Butt or Lap Joints |
| Riveted Steel, Shingled Arrangement | Lowest point on each ring and 1 foot (or 300 millimeters) below top of top ring |
| Riveted Steel, In-and-Out Arrangement | Lowest point above horizontal rivet rows on each ring, and 1 foot (or 300 millimeters) below top of top ring |
| Riveted Steel, Combination Shingled and In-and-Out Arrangement | Lowest point above horizontal rivet rows on each ring, and 1 foot (or 300 millimeters) below top of top ring |
| Steel Tank One Ring High, Riveted Lap Joints on bottom of shell | 25 and 75 percent above |
| Bolted Steel, Lapped Vertical Joints | 25 and 75 percent above bottom of each ring |
| Bolted Steel, Flanged Vertical Joints | 75 percent above bottom of each ring |

The controller 136 can calculate the volume of the tank 102 and generate a three dimensional model of the tank 102.

The controller 136 may include or be part of a control system. The controller 136 is intended to include various forms of digital computers, such as printed circuit boards (PCB), processors, digital circuitry, or otherwise parts of a fracture geometry mapping system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 136 can include a processor, a memory, a storage device, and an input/output device. Each of the processor, a memory, a storage device, and an input/output device can be interconnected using a system bus. The processor is capable of processing instructions for execution within the controller 136. The processor may be designed using any of a number of architectures. For example, the processor may be a CISC (Complex Instruction Set Computers) processor, a RISC (Reduced Instruction Set Computer) processor, or a MISC (Minimal Instruction Set Computer) processor.

In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the controller 136. In one implementation, the memory is a computer-readable medium. In one implementation, the memory is a volatile memory unit. In another implementation, the memory is a non-volatile memory unit.

The storage device is capable of providing mass storage for the controller. In one implementation, the storage device is a computer-readable medium. In various different implementations, the storage device may be a floppy disk device, a hard disk device, an optical disk device, or a tape device.

The input/output device provides input/output operations for the controller 136. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

Figure 2:
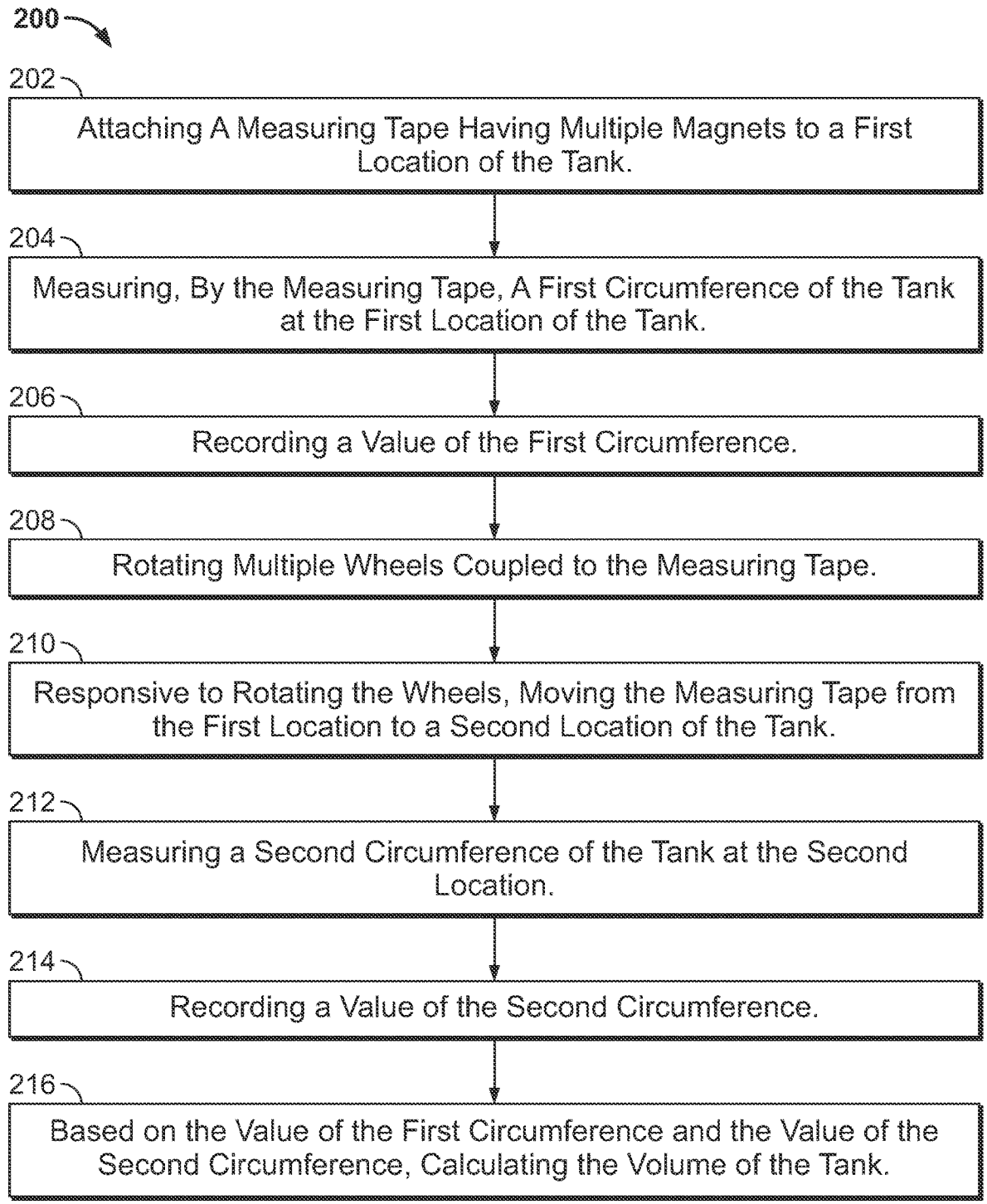
FIG. 2 is a flow chart of an example method of measuring a volume of a tank according to the implementations of the present disclosure.

FIG. 2 is a flow chart 200 of an example method of determining a volume of a tank according to the implementations of the present disclosure. At 202, a measuring tape having multiple magnets is attached to a first location of the tank. For example, referring to FIG. 1A, in the holder sub-assembly 106 and the side attachment sub-assembly 108 of the tape measure assembly 100 the magnetic wheels 114 can couple the holder sub-assembly 106 and the side attachment sub-assembly 108 to the outer surface 112 of the tank 102. For example, referring to FIG. 1C, the magnet 156 positioned on a bottom surface 142 of the enclosure 118 of the holder sub-assembly 106 can magnetically couple the holder sub-assembly 106 to the outer surface 112 of the tank 102. For example, referring to FIGS. 1C and 1D, the multiple magnets 168 of the measuring tape holder 150 can magnetically couple the measuring tape holder 150 to the tank 102. The tank can be filled with a fluid.

At 204, a first circumference of the tank at the first location of the tank is measured by the measuring tape. Measuring the first circumference can include moving a side attachment sub-assembly coupled to a first end of the measuring tape from a holder sub-assembly coupled to a second end of the measuring tape and extending the measuring tape about a portion of the first circumference. Extending the measuring tape about the portion of the first circumference can include rolling the measuring tape across magnetic rollers coupled to the measuring tape. Referring to FIGS. 1A-1I, the side attachment sub-assembly 108 moves away from the holder sub-assembly 106 along the first circumference 184.

In some cases, measuring the first circumference includes contacting the side attachment sub-assembly to the holder sub-assembly about the portion of the first circumference. The portion of the first circumference can be the entire circumference of the tank. Referring to FIG. 1I, the side attachment sub-assembly 108 approaches the holder sub-assembly 106 to contact the holder sub-assembly 106 in order to measure the first circumference 184 of the tank 102 in a single measurement.

At 206, a value of the first circumference is recorded. Referring to FIGS. 1A, 1D, 1H, and 1I, the capacitive encoder 160 sends a signal representing the value of the first circumference 184 to the controller 136. The controller 136 stores the value of the first circumference 184 in the memory.

At 208, multiple wheels coupled to the measuring tape are rotated. Referring to FIGS. 1A, 1D, 1G, and 1H, the controller 136 sends a signal to the magnetic wheels 114 of the holder sub-assembly 106 and the side attachment sub-assembly 108 to rotate.

At 210, responsive to rotating the wheels, the measuring tape is moved from the first location to a second location of the tank. Moving from the first location to the second location can be moving in an upward direction. Referring to FIGS. 1A, 1D, 1G, and 1H, as the magnetic wheels 114 of the holder sub-assembly 106 and the side attachment sub-assembly 108 rotate, the tape measure assembly 100 moves from the first circumference 184 to the second circumference 186.

At 212, a second circumference of the tank at the second location is measured. The second location can be farther from a surface of the Earth than the first location. Referring to FIGS. 1A and 1I, the tape measure assembly 100 measures the second circumference 186.

Measuring the second circumference can include moving a side attachment sub-assembly coupled to a first end of the measuring tape from a holder sub-assembly coupled to a second end of the measuring tape and extending the measuring tape about a portion of the second circumference. Extending the measuring tape about the portion of the second circumference can include rolling the measuring tape across multiple magnetic rollers coupled to the measuring tape. In some cases, measuring the second circumference includes contacting the side attachment sub-assembly to the holder sub-assembly about the portion of the second circumference. Referring to FIGS. 1A-1I, the side attachment sub-assembly 108 moves away from the holder sub-assembly 106 along the second circumference 186.

At 214, a value of the second circumference is recorded. Referring to FIGS. 1A, 1D, 1H, and 1I, the capacitive encoder 160 sends a signal representing the value of the second circumference 186 to the controller 136. The controller 136 stores the value of the second circumference 186 in the memory.

At 216, based on the value of the first circumference and the value of the second circumference, the volume of the tank is calculated. Calculating the volume of the tank can include generating a three dimensional model of the tank. Referring to FIGS. 1A, 1D, 1H, and 1I, the controller 136 calculates the volume of the tank 102 from the recorded values of the first circumference 184 and the second circumference 186. The controller 136 can then multiply each of the heights 190 and 192 by the first circumference 184 and the second circumference 186, respectively, to calculate the volume of the tank 102.

Figure 3A:
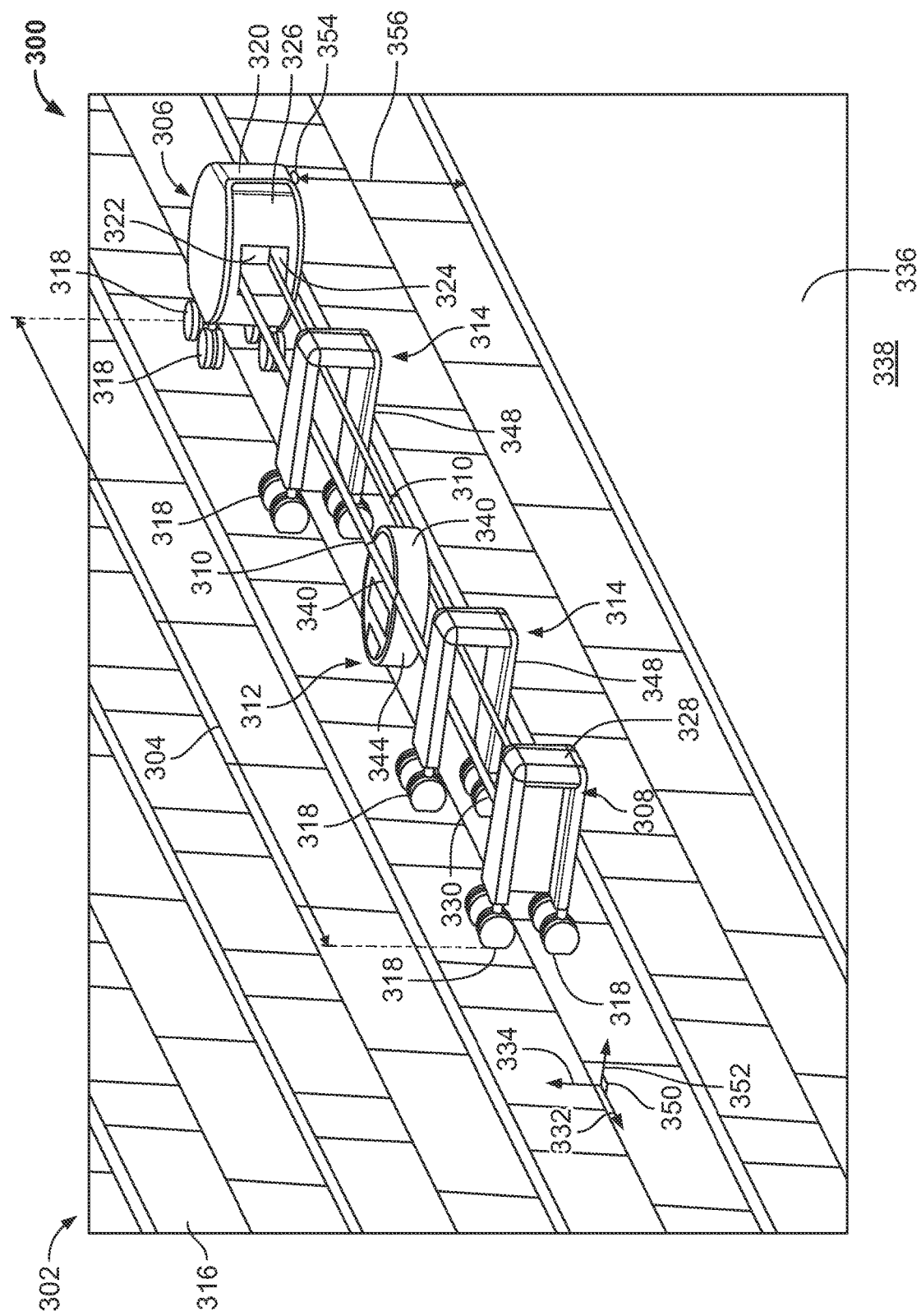
FIG. 3A is a view of another exemplary tape measure assembly positioned on a tank.
Figure 3B:
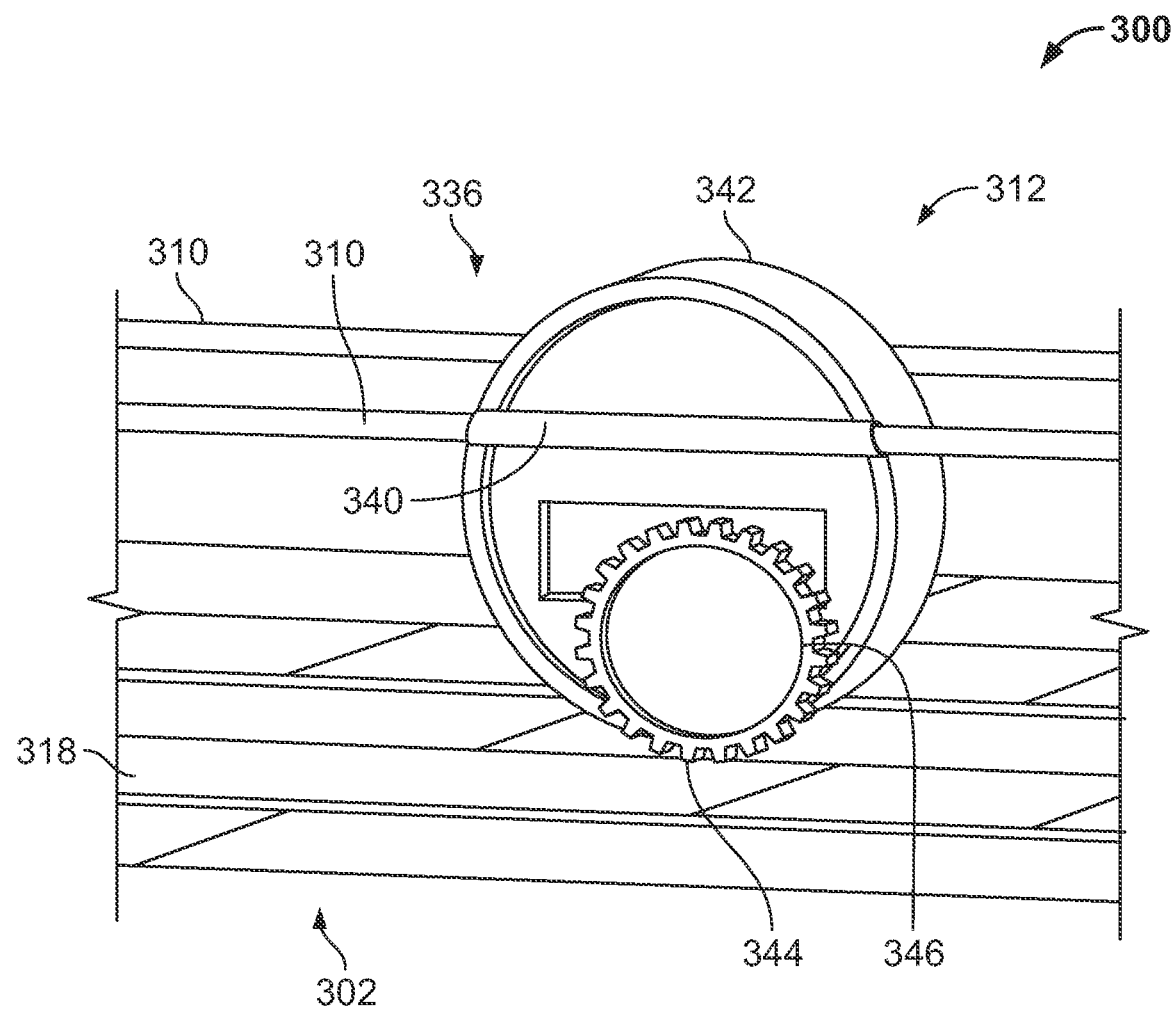
FIG. 3B is a view of a roller tape measure sub-assembly of the tape measure assembly of FIG. 3A.
Figure 3C:
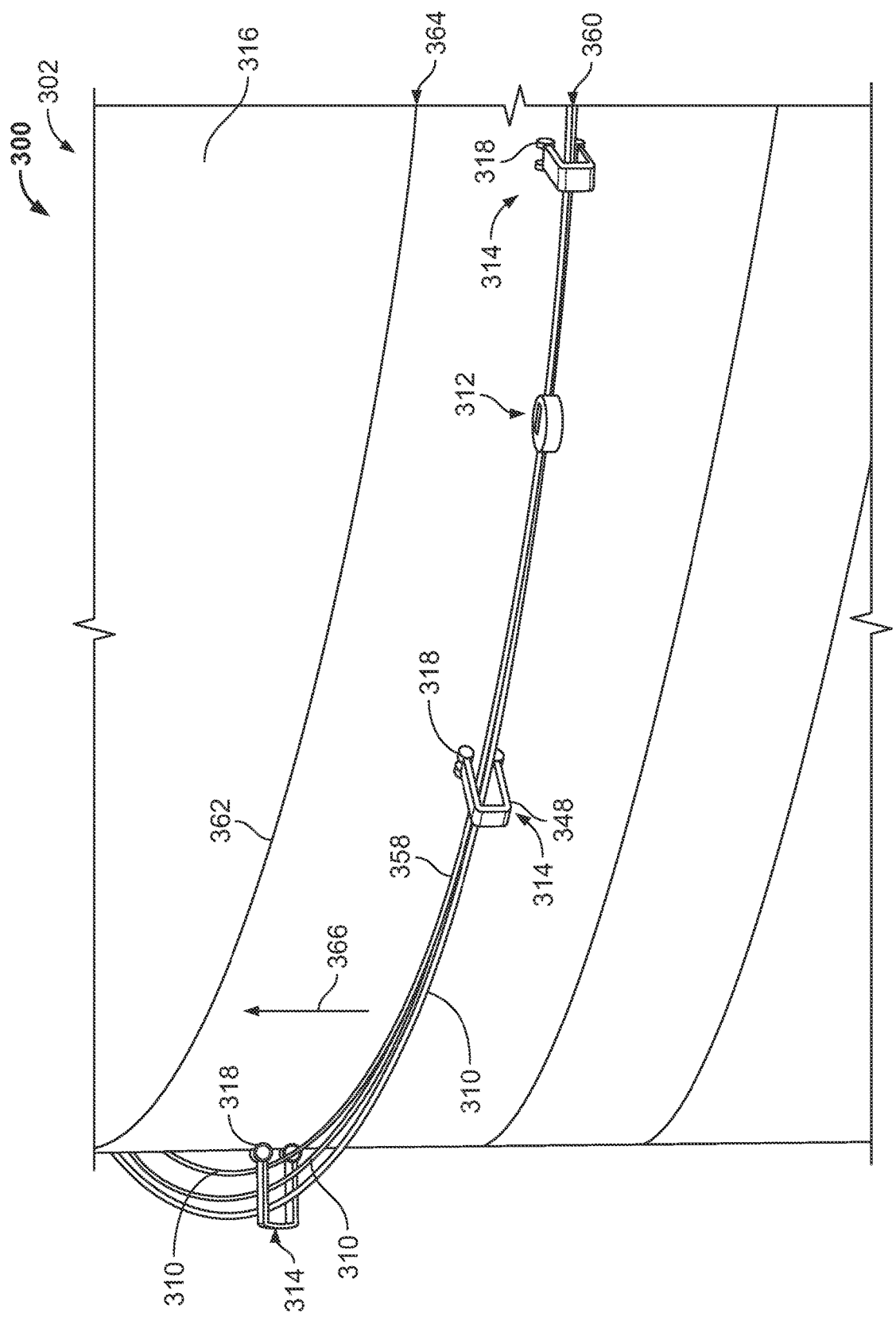
FIG. 3C is another isometric view of the tape measure assembly of FIG. 3C positioned on the tank.

FIGS. 3A-3C illustrate another example implementation of the present disclosure. FIG. 3A is a view of another exemplary tape measure assembly 300 positioned on a tank 302. The tank 302 is substantially similar to the tank 102 previously described. The tape measure assembly 300 measures multiple dimensions 304 of the tank 302 and based on values of the dimensions 304, calculates a volume of the tank 302. The tape measure assembly 300 has a wire spool sub-assembly 306, a wire end sub-assembly 308, multiple wires 310 coupled to and extending between the wire spool sub-assembly 306 and the wire end sub-assembly 308, a roller tape measure sub-assembly 312 coupled to the wires 310 and movable along the wires 310 to measure the dimensions 304 of the tank 302, wire guide sub-assemblies 314 positioned about and coupled to the wires 310, and a controller 326 operably coupled to the wire spool sub-assembly 306, the wire guide sub-assemblies 314, the wire end sub-assembly 308, and the roller tape measure sub-assembly 312. The tape measure assembly 300 has magnets, described in more detail below, to couple the wire spool sub-assembly 306, the wire end sub-assembly 308, the roller tape measure sub-assembly 312, and wire guide sub-assemblies 314 to an outer surface 316 of the tank 302. For example, in the wire spool sub-assembly 306, the wire end sub-assembly 308, and wire guide sub-assemblies 314 of the tape measure assembly 300 shown in FIG. 3A, the magnets can be magnetic wheels 318, substantially similar to the magnetic wheels 114 described previously in reference to FIGS. 1A-1I. The magnetic wheels 318 can couple the tape measure assembly 300 to the outer surface 316 of the tank 302.

The wire spool sub-assembly 306 has an outer body 320 with a spool 322 rotatable positioned within the outer body 320. The wires 310 wrap around the spool 322 and extend from the outer body 320 as the spool 322 rotates. The wires 310 have a first end 324 coupled to the spool 322. The wires 310 extend outward from the outer body 320 in the direction of arrow 332 to measure the dimension 304. The dimension 304 can be a portion of a circumference of the tank 302 or the entire circumference of the tank 302. The wires 310 can include a power cable and a control cable (not shown).

The wire spool sub-assembly 306 has multiple magnetic wheels 318 to magnetically adhere the wire spool sub-assembly 306 the outer surface 316 of the tank 302. The magnetic wheels 318 are substantially similar to the magnetic wheels 114 previously described. The magnetic wheels 318 can rotate to move the tape measure assembly 300 in any direction along the outer surface 316 of the tank 302. For example, the magnetic wheels 318 can rotate to move the tape measure assembly 300 in the direction of arrow 332 or 334. Arrow 334 is in an upward direction from a surface 336 of the Earth 338.

The wire end sub-assembly 308 has a body 328 which mechanically coupled to a second end 330, also referred to as a terminating end, of the wires 310. The wire end sub-assembly 308 has multiple magnetic wheels 318 coupled to the body 328. The wires 310 can conduct control signals along the control cable from the controller 326 to the wire end sub-assembly 308 to operate the wire end sub-assembly 308. For example, the controller 326 can send a control signal to the one or more of the magnetic wheels 318 of the wire end sub-assembly 308 to rotate, causing the wire end sub-assembly 308 to move in the direction of arrow 332 and extending the wires 310 from the wire spool sub-assembly 306.

FIG. 3B is a view of the roller tape measure sub-assembly 312 of the tape measure assembly 300 of FIG. 3A. Referring to FIGS. 3A-B, the roller tape measure sub-assembly 312 is coupled to the wires 310 and moves along the wires 310. As the roller tape measure sub-assembly 312 moves along the wires 310, the roller tape measure sub-assembly 312 measures the dimension 304 of the outer surface 316 of the tank 302. The roller tape measure sub-assembly 312 can send a signal representing a value of the measured dimension 304 to the controller 326 along the wires 310. The roller tape measure sub-assembly 312 can include channels 340 or sleeves to couple an enclosure 342 of the roller tape measure sub-assembly 312 to the wires 310. The channels 340 allow the roller tape measure sub-assembly 312 to slide along the wires 310. In some cases, the roller tape measure sub-assembly 312 has a set of wheels or gears positioned internal to the roller tape measure sub-assembly 312 and coupled to the wires 310 to move the roller tape measure sub-assembly 312 along the wires 310.

The roller tape measure sub-assembly 312 has a wheel 344 extending from the enclosure 342. Referring to FIG. 3B, the wheel 344 can include a capacitive rotary encoder 346 to measure the dimension 304. The capacitive rotary encoder 346 is substantially similar to the capacitive rotary encoder previously described earlier.

FIG. 3C is another isometric view of the tape measure assembly of FIG. 3C positioned on the tank. Referring to FIGS. 3A and 3C, each of the wire guide sub-assemblies 314 have a body 348. The body 348 of the wire guide sub-assembly 314 can be positioned about and coupled to the wires 310. The body 348 can maintain the wires 310 aligned (generally parallel) as the wires 310 extend around the circumference of the tank 302. In other words, the body 348 can prevent the wires 310 from sagging toward the surface 336 of the Earth 338. The bodies 348 can maintain the wires 310 in a horizontal plane 350 in the direction of arrow 332 and arrow 352. The horizontal plane 350 can be generally parallel to the surface 336 of the Earth. The horizontal plane 350 can be perpendicular to the outer surface 316 of the tank 302. The bodies 348 can be u-shaped, as shown in FIGS. 3A and 3C. The wire guide sub-assemblies 314 each have magnetic wheels 318 to move the wire guide sub-assemblies 314 on the outer surface 316 of the tank 302. Each of the wire guide sub-assemblies 314 can have a receiver (not shown) or a sub-controller (not shown) to receive a control signal from the controller 326 to operate one or more of the magnetic wheels 318 of the wire guide sub-assemblies 314.

Referring to FIGS. 3A and 3C, the wire spool sub-assembly 306 has a sensor 354 to sense a condition of the wire spool sub-assembly 306. In the example wire spool sub-assembly 306, the sensor 354 senses a height 356 (shown in FIG. 3A) of the wire spool sub-assembly 306 from the surface 336. The sensor 354 transmits a signal representing a value of the height 356 to the controller 326. Each of the wire guide sub-assemblies 314 and the wire end sub-assembly 308 can additional have the sensor 354 to sense the respective height 356 of the respective wire guide sub-assemblies 314 and the wire end sub-assembly 308 relative to the surface 336.

The controller 326 is operably coupled to the wire spool sub-assembly 306, the wire guide sub-assemblies 314, the wire end sub-assembly 308, and the roller tape measure sub-assembly 312 to measure the dimension 304 of the tank 302. The controller 326 is generally similar to the controller 136 described previously.

The controller 326 can perform operations including positioning the wire spool sub-assembly 306, the wire guide sub-assemblies 314, and the wire end sub-assembly 308 about a first circumference 358, shown in FIG. 3C, at a first location 360 of the tank 302. The controller 326 then measures the first circumference 358 of the first location 360 of the tank 302 by moving the wire end sub-assembly 308 along the first circumference 358 along the outer surface 316 of the tank 302, thus extending the wires 310. The controller 326 can then transmit a control signal to the wire guide sub-assemblies 314 to move along the wires 310 to position or maintain the wires 310 in the horizontal plane 350 by rotating the magnetic wheels 318. The wires 310 can extend about a portion (that is the dimension 304) of the tank 302, or the entire first circumference 358 (shown in FIG. 3C).

The controller 326 can then send a control signal to the wheel 344 of the roller tape measure sub-assembly 312 to rotate, causing the roller tape measure sub-assembly 312 to slide along the wires 310 by the channels 340. Responsive to sliding along the wires 310, the roller tape measure sub-assembly 312 move along the first circumference 358 about the tank 302. As the wheel 344 rotates, the capacitive rotary encoder 346 measures the dimension 304 of the tank 302. The capacitive rotary encoder 346 can transmit the signal representing the value of the first circumference 358 at the first location 360 to the controller 326. The controller 326 can record the value of the first circumference 358 at the first location 360.

The controller 326 can then transmit a control signal to each of the wire spool sub-assembly 306, the wire guide sub-assemblies 314, and the wire end sub-assembly 308 to move from the first circumference 358 of the first location 360 to a second circumference 362 of a second location 364. The second location 364 can be different that the first location 360. In some cases, as shown in FIG. 3C, the second circumference 362 of the second location 364 is in an upward direction as shown by arrow 366 from the first circumference 358 of the first location 360. The upward direction shown by arrow 366 is away from a surface 336 of the Earth 338. For example, with the wire end sub-assembly 308 and the wire guide sub-assemblies 314, fully extended around the first circumference 358, the magnetic wheels 318 of each of the wire spool sub-assembly 306, the wire guide sub-assemblies 314, and the wire end sub-assembly 308 can rotate to move each of the wire spool sub-assembly 306, the wire guide sub-assemblies 314, and the wire end sub-assembly 308 in the upward direction of arrow 334 to the second location 364. For example, when the wire end sub-assembly 308 is positioned to measure the portion (dimension 304) of the first circumference 358, the controller 326 can transmit a control signal to the magnetic wheels 318 to rotate in the direction of arrow 332, moving the wire spool sub-assembly 306, the wire guide sub-assemblies 314, and the wire end sub-assembly 308 along the first circumference 358 in the direction of arrow 332.

The controller 326 can then send a control signal to the wheel 344 of the roller tape measure sub-assembly 312 to rotate, causing the roller tape measure sub-assembly 312 to slide along the wires 310 by the channels 340. Responsive to sliding along the wires 310, the roller tape measure sub-assembly 312 move along the second circumference 362 about the tank 302. As the wheel 344 rotates, the capacitive rotary encoder 346 measures the dimension 304 of the tank 302. The capacitive rotary encoder 346 can transmit the signal representing the value of the second circumference 362 at the second location 364 to the controller 326. The controller 326 can record the value of the second circumference 362 at the second location 364.

Based on the value of the first circumference 358 and the value of the second circumference 364, the controller can calculate a volume of the tank 302. The controller 326 can calculate a volume of the tank 302 from the recorded values of the first circumference 358 and the second circumference 362. Calculating the volume of the tank 302 can include multiple one, two, or more of the measured circumferences. The volume of a tank can be calculated by multiplying the height 356, shown in FIG. 3A, by one of the circumferences, for example, the first circumference 358. The controller 326 can then multiply each of the heights for each of the circumferences 358, 362 by the first circumference 358 and the second circumference 362, respectively, to calculate the volume of the tank 302. In some implementations, the controller 136 calculates a volume of the tank 102 by automating the manual strapping method according to an industry standard. The calculations can be performed in accordance with applicable International Standards Organization (ISO) and API standards, but with higher accuracy and precision. The volume of the tank can be determined by following the procedures of an API or ISO standards, for example, API 2.2 A, B, C, D and/or ISO 7507-1, 2, 3, 4/5). The circumference measurement methodology of API Standard 2.2 is shown in above in Table 1. Circumference Measurement Methodology from API 2.2A. Calculating the volume of the tank 302 can include generating a three dimensional model of the tank 302.

Figure 4:
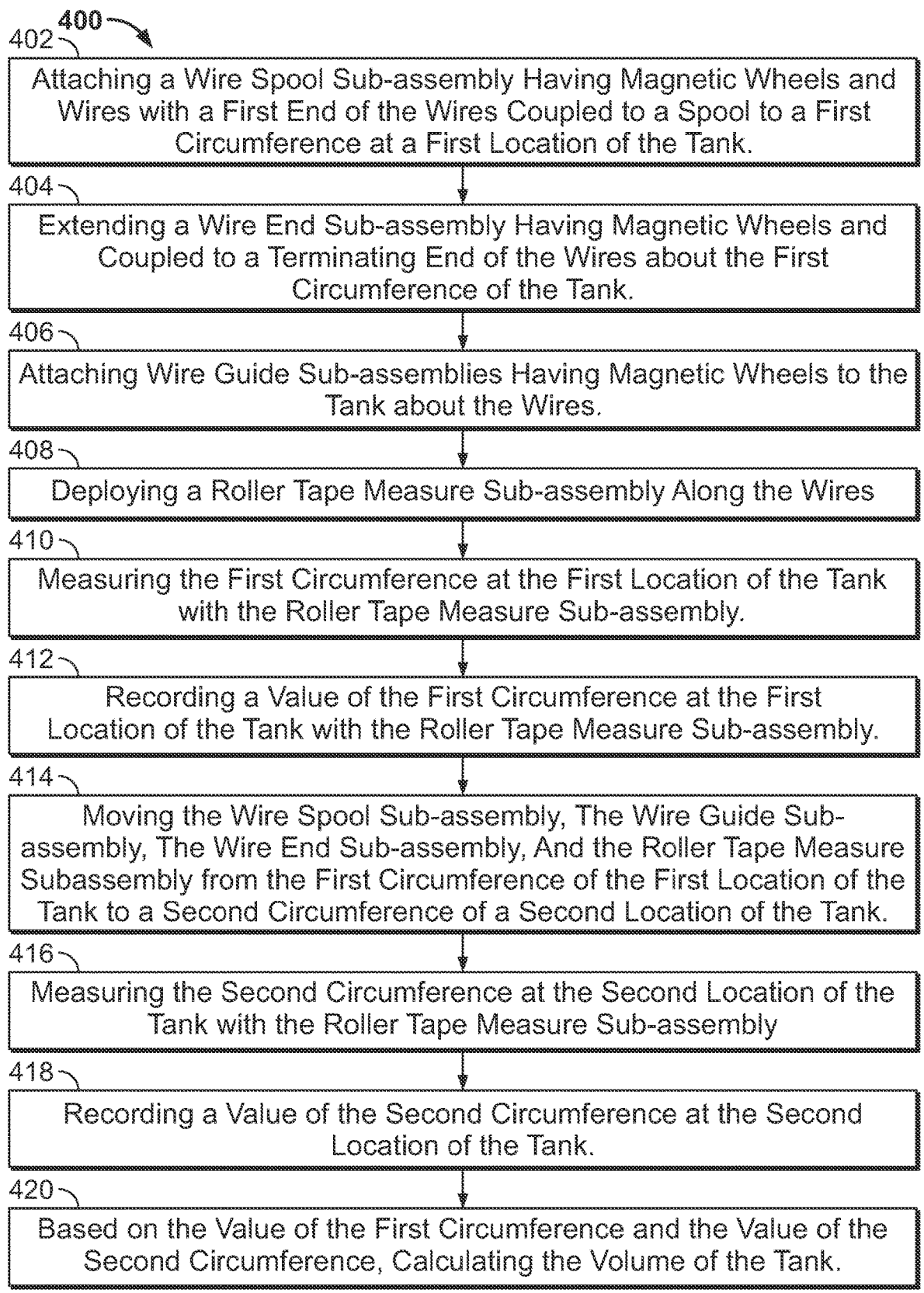
FIG. 4 is a flow chart of another example method of determining a volume of a tank according to the implementations of the present disclosure.

FIG. 4 is a flow chart of another example method 400 of determining a volume of a tank according to the implementations of the present disclosure. Example method 400 determines the volume of the tank with the tape measure assembly 300.

At 402, a wire spool sub-assembly having magnetic wheels and wires with a first end of the wires coupled to a spool of wire spool sub-assembly is attached to a first circumference at a first location of the tank. For example, referring to FIGS. 3A and 3C, the magnetic wheels 318 of the wire spool sub-assembly 306 attach to the outer surface 316 of the tank 302 at the first circumference 358 at the first location 360 on the tank 302.

At 404, a wire end sub-assembly having magnetic wheels and coupled to a terminating end of the wires is extended about the first circumference of the tank. For example, as shown in FIG. 3C the wires 310 can extend from the spool 322 of the wire spool sub-assembly 306 about the first circumference 358.

At 406, wire guide sub-assemblies having magnetic wheels are attached to the tank about the wires. Referring to FIGS. 3A and 3C, the magnetic wheels 318 of the wire guide sub-assemblies 314 are attached to the tank 302 about the wires 310. The u-shaped body 348 of the wire guide sub-assemblies 314 is around the wires 310.

At 408, a roller tape measure sub-assembly is deployed along the wires. For example, referring to FIGS. 3A-3C, the wheel 344 of the roller tape measure sub-assembly 312 rotates to move the roller tape measure sub-assembly 312 in the direction of arrow 332 (shown in FIG. 3A).

At 410, the first circumference at the first location of the tank is measured with the roller tape measure sub-assembly. As shown in FIGS. 3A-3C, when the roller tape measure sub-assembly 312 moves along the first circumference 358, the rotary capacitive encoder 346 of the roller tape measure sub-assembly 312 measures the first circumference 358.

At 412, a value of the first circumference at the first location of the tank is recorded with the roller tape measure sub-assembly. For example, as shown in FIGS. 3A-3C, the controller 326 records the value of the first circumference 358 of the tank 302.

At 414, the wire spool sub-assembly, the wire guide sub-assembly, the wire end sub-assembly, and the roller tape measure sub-assembly are moved from the first circumference of the first location of the tank to a second circumference of a second location of the tank. The second location is at a different location than the first location. Referring to FIGS. A and 3C, for example, the magnetic wheels 318 of the wire spool sub-assembly 306, the wire guide sub-assemblies 314, the wire end sub-assembly 308 rotate to move the wire spool sub-assembly 306, the wire guide sub-assemblies 314, the wire end sub-assembly 308 from the first location 360 to the second location 364.

The second location can be farther from a surface of the Earth than the first location. For example, the respective heights 356 of circumferences 358, 362 from the surface 336 can differ.

Moving from the first location to the second location can include moving in an upward direction. For example, the magnetic wheels 318 can rotate to move the wire spool sub-assembly 306, the wire guide sub-assemblies 314, and the wire end sub-assembly 308 in the direction of arrow 366 as shown in FIGS. 3A and 3C.

At 416, the second circumference at the second location of the tank is measured with the roller tape measure sub-assembly. As shown in FIGS. 3A-3C, when the roller tape measure sub-assembly 312 moves along the second circumference 362, the rotary capacitive encoder 346 of the roller tape measure sub-assembly 312 measures the second circumference 362. Measuring the first circumference and the second circumference can include aligning the wires in a horizontal plane.

At 418, a value of the second circumference at the second location of the tank is recorded. For example, as shown in FIGS. 3A-3C, the controller 326 records the value of the second circumference 362 of the tank 302.

At 420, based on the value of the first circumference and the value of the second circumference, the volume of the tank is calculated. Calculating the volume of the tank can include generating a three dimensional model of the tank.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A method for determining a volume of a tank, the method comprising:
    attaching, by a plurality of magnetic rollers, a measuring tape to a first location of the tank;
    measuring, by the measuring tape, a portion of a first circumference of the tank at the first location of the tank;
    recording a value of the portion of the first circumference;
    rotating a plurality of wheels coupled to the measuring tape;
    responsive to rotating the plurality of wheels, moving the measuring tape from the first location to a second location of the tank;
    measuring a portion of a second circumference of the tank at the second location;
    recording a value of the portion of the second circumference; and
    based on the value of the portion of the first circumference and the value of the portion of the second circumference, calculating the volume of the tank as a function of the value of the portion of the first circumference and the value of the portion of the second circumference.

2. The method of claim 1, wherein the second location is farther from a surface of the Earth than the first location.

3. The method of claim 1, wherein moving from the first location to the second location comprises moving in an upward direction.

4. The method of claim 1, wherein a side attachment sub-assembly comprises one or more of the plurality of wheels, the side attachment sub-assembly coupled to a first end of the measuring tape, and moving the measuring tape from the first location to the second location of the tank comprises:

moving, responsive to rotating the plurality of wheels, the side attachment sub-assembly from a holder sub-assembly coupled to a second end of the measuring tape; and extending the measuring tape about at least one of the portion of the first circumference or the portion of the second circumference.

5. The method of claim 4, further comprising extending the measuring tape about at least one of an entirety of the first circumference or the second circumference.

6. The method of claim 5, further comprising responsive to extending the measuring tape about at least one of the entirety of the first circumference or the second circumference, contacting the side attachment sub-assembly to the holder sub-assembly.

7. The method of claim 4, wherein extending the measuring tape about the portion of the at least one of the first circumference or the second circumference comprises rolling the measuring tape across the plurality of magnetic rollers coupled to the measuring tape.

8. The method of claim 1, wherein calculating the volume of the tank comprises generating a three dimensional model of the tank.

9. The method of claim 1, wherein the tank is configured to store a quantity of a hydrocarbon fluid.

10. A tape measure assembly configured to measure an object, the tape measure assembly comprising:
a holder sub-assembly comprising:
a first enclosure;
a first wheel coupled to the first enclosure; and
a first magnet positioned in the holder sub-assembly;
a side attachment sub-assembly, the side attachment sub-assembly comprising;
a second enclosure;
a second wheel coupled to the second enclosure; and
a second magnet positioned in the side attachment sub-assembly;
a measuring tape comprising:
a first end coupled to the first enclosure of the holder sub-assembly; and
a second end coupled to the second enclosure of the side attachment sub-assembly; and
a controller operatively coupled to the holder sub-assembly, the measuring tape, and the side attachment sub-assembly, the controller configured to perform operations comprising:
measuring a plurality of dimensions of the object; and
based on values of the plurality of dimensions, calculating a volume of the object.

11. The assembly of claim 10, wherein the plurality of dimensions of the object comprises portions of a circumference of the object.

12. The assembly of claim 10, wherein the plurality of dimensions comprise a first circumference at a first location of the object and a second circumference at a second location different that the first location of the object.

13. The assembly of claim 10, wherein:
the first magnet is positioned on the first wheel; and
the second magnet is positioned on the second wheel.

14. The assembly of claim 10, wherein:
the first magnet is positioned in a first chassis of the first enclosure; and
the second magnet is positioned in a second chassis of the second enclosure.

15. The assembly of claim 10, wherein the first wheel and the second wheel comprise magnetic omni-directional wheels.

16. The assembly of claim 10, further comprising:
a first motor coupled to the first wheel; and
a second motor coupled to the second wheel.

17. The assembly of claim 10, further comprising a plurality of caster wheels coupled to the first enclosure and the second enclosure.

18. The assembly of claim 10, further comprising a plurality of magnetic rollers coupled to a first surface of the measuring tape, the first surface facing the object, the magnetic rollers rotatable as the measuring tape extends across a surface of the object.

19. The assembly of claim 10, wherein the measuring tape comprises a capacitive encoder comprising:
a plurality of tracked copper segments extending across a surface of the measuring tape; and
a plurality of linear copper segments, wherein a movement of the plurality of tracked copper segments relative to the linear copper segments generates a capacitive charge correlating to the plurality of dimensions of the object.

20. The assembly of claim 19, wherein the capacitive encoder is a capacitive linear encoder.

21. The assembly of claim 10, further comprising a sensor coupled to the holder sub-assembly, the sensor configured to:
sense a height of the tape measure assembly relative to the surface of the Earth; and
transmit a signal representing the height to the controller.

22. A method for determining a volume of a tank, the method comprising:
attaching a wire spool sub-assembly to a first circumference at a first location of the tank, the wire spool sub-assembly comprising:
a first plurality of magnetic wheels; and
a plurality of wires, a first end of the plurality of wires coupled to a spool of wire spool sub-assembly;
extending a wire end sub-assembly comprising a third plurality of magnetic wheels, about the first circumference of the tank, the wire end sub-assembly, coupled to a terminating end of the plurality of wires;
attaching a plurality of wire guide sub-assemblies to the tank about the plurality of wires by a second plurality of magnetic wheels;
deploying a roller tape measure sub-assembly along the plurality of wires;
measuring the first circumference at the first location of the tank with the roller tape measure sub-assembly;
recording a value of the first circumference at the first location of the tank with the roller tape measure sub-assembly;
moving the wire spool sub-assembly, the wire guide sub-assembly, the wire end sub-assembly, and the roller tape measure sub-assembly from the first circumference of the first location of the tank to a second circumference of a second location of the tank, the second location different than the first location;
measuring the second circumference at the second location of the tank with the roller tape measure sub-assembly;
recording a value of the second circumference at the second location of the tank; and
based on the value of the first circumference and the value of the second circumference, calculating the volume of the tank.

23. The method of claim 22, wherein the second location is farther from a surface of the Earth than the first location.

24. The method of claim 22, wherein moving from the first location to the second location comprises moving in an upward direction.

25. The method of claim 22, wherein measuring the first circumference and the second circumference comprises aligning the plurality of wires in a horizontal plane.

26. The method of claim 22, wherein calculating the volume of the tank comprises generating a three dimensional model of the tank.

27. A tape measure assembly configured to measure a tank, the tape measure assembly comprising:
   a wire spool sub-assembly comprising:
      a plurality of wires extendable from wire spool sub-assembly around a circumference of the tank; and
      a first plurality of magnetic wheels coupled to the wire spool sub-assembly;
   a plurality of wire guide sub-assemblies, each wire guide sub-assembly of the plurality of wire guide sub-assemblies comprising:
      a u-shaped body positioned about and coupled to the plurality of wires; and
      a second plurality of magnetic wheels coupled to the u-shaped body;
   a wire end sub-assembly coupled to a terminating end of the plurality of wires, the wire end sub-assembly comprising a third plurality of magnetic wheels;
   a roller tape measure sub-assembly coupled to the plurality of wires and movable along the plurality of wires; and
   a controller operably coupled to the wire spool sub-assembly, the plurality of wire guide sub-assemblies, the wire end sub-assembly, and the roller tape measure sub-assembly.

28. The tape measure assembly of claim 27, wherein the controller is configured to perform operations comprising:
   positioning the wire spool sub-assembly, the plurality of wire guide sub-assemblies, and the wire end sub-assembly about the circumference at a first location of the tank;
   measuring, by the roller tape measure sub-assembly, a first circumference of the first location of the tank;
   recording a value of the first circumference at the first location;
   moving each of the wire spool sub-assembly, the plurality of wire guide sub-assemblies, and the wire end sub-assembly from the first circumference of the first location to a second circumference of a second location, the second location different that the first location;
   measuring the second circumference at the second location of the tank;
   recording a value of the second circumference at the second location; and
   based on the value of the first circumference and the value of the second circumference, calculating a volume of the tank.

29. The assembly of claim 28, wherein the controller is further configured to perform operations comprising moving each of the wire spool sub-assembly, the plurality of wire guide sub-assemblies, and the wire end sub-assembly from the first circumference of the first location to the second circumference of the second location in an upward direction.

30. The assembly of claim 27, wherein the controller is further configured to perform operations comprising aligning the plurality of wires in a horizontal plane.

31. The assembly of claim 27, wherein the controller is further configured to perform operations comprising generating a three dimensional model of the tank.

32. The assembly of claim 27, wherein a roller of the roller tape measure sub-assembly moves the roller tape measure sub-assembly relative to the surface of the tank.

33. The assembly of claim 27, further comprising a sensor configured to:
   sense a height of the tape measure assembly relative to a surface of the Earth; and
   transmit a signal representing the height to the controller.

* * * * *

UNITED STATES PATENT AND TRADEMARK OFFICE
CERTIFICATE OF CORRECTION

PATENT NO. : 12,292,277 B2
APPLICATION NO. : 17/840929
DATED : May 6, 2025
INVENTOR(S) : Sahejad Patel, Abdulwahab A. Halawani and Hesham Jifri Page 1 of 1

It is certified that error appears in the above-identified patent and that said Letters Patent is hereby corrected as shown below:

In the Claims

In Column 21, Line 56, Claim 12, please replace "that" with -- than --

In Column 24, Line 9, Claim 28, please replace "that" with -- than --

Signed and Sealed this
Twenty-fourth Day of June, 2025

Coke Morgan Stewart
*Acting Director of the United States Patent and Trademark Office*